United States Patent
Chen et al.

(10) Patent No.: US 12,047,567 B2
(45) Date of Patent: Jul. 23, 2024

(54) SYSTEM AND METHOD FOR APPLYING ADAPTIVE LOOP FILTER IN VIDEO CODING

(71) Applicant: BEIJING DAJIA INTERNET INFORMATION TECHNOLOGY CO., LTD., Beijing (CN)

(72) Inventors: Yi-Wen Chen, San Diego, CA (US); Xianglin Wang, San Diego, CA (US); Xiaoyu Xiu, San Diego, CA (US); Hong-Jheng Jhu, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 286 days.

(21) Appl. No.: 17/573,332

(22) Filed: Jan. 11, 2022

(65) Prior Publication Data

US 2022/0239906 A1   Jul. 28, 2022

Related U.S. Application Data

(60) Provisional application No. 63/141,627, filed on Jan. 26, 2021.

(51) Int. Cl.
| | |
|---|---|
| *H04N 19/117* | (2014.01) |
| *H04N 19/154* | (2014.01) |
| *H04N 19/176* | (2014.01) |
| *H04N 19/186* | (2014.01) |
| *H04N 19/82* | (2014.01) |

(52) U.S. Cl.
CPC ......... *H04N 19/117* (2014.11); *H04N 19/154* (2014.11); *H04N 19/176* (2014.11); *H04N 19/186* (2014.11); *H04N 19/82* (2014.11)

(58) Field of Classification Search
CPC .... H04N 19/117; H04N 19/147; H04N 19/82; H04N 19/192; H04N 19/635; H04N 19/86

See application file for complete search history.

(56) References Cited

U.S. PATENT DOCUMENTS

| | | | |
|---|---|---|---|
| 11,044,470 B2 * | 6/2021 | Kim | H04N 19/119 |
| 2005/0196063 A1 * | 9/2005 | Guangxi | H04N 19/162 |
| | | | 382/268 |
| 2010/0260263 A1 * | 10/2010 | Kotaka | H04N 19/154 |
| | | | 375/E7.243 |
| 2010/0309286 A1 * | 12/2010 | Chen | H04N 13/207 |
| | | | 375/E7.076 |

(Continued)

*Primary Examiner* — Daniel Chang
(74) *Attorney, Agent, or Firm* — Bayes PLLC

(57) ABSTRACT

Systems and methods for applying an adaptive loop filter (ALP) in video coding are provided. The method may include determining a first rate-distortion cost of applying the adaptive loop filter on a reconstructed block. The reconstructed block includes a reconstructed version of an image block of an image frame from a video. The method may further include determining a second rate-distortion cost of not applying the adaptive loop filter on the reconstructed block. The method may additionally include determining whether to apply the adaptive loop filter for processing the reconstructed block based on the first rate-distortion cost and the second rate-distortion cost.

20 Claims, 13 Drawing Sheets

(56) References Cited

U.S. PATENT DOCUMENTS

| | | | |
|---|---|---|---|
| 2011/0026600 A1* | 2/2011 | Kenji | H04N 19/86 375/E7.076 |
| 2012/0183078 A1* | 7/2012 | Lai | H04N 19/82 375/E7.193 |
| 2015/0055702 A1* | 2/2015 | Heo | H04N 21/816 375/240.12 |
| 2015/0098513 A1* | 4/2015 | Fu | H04N 19/13 375/240.25 |
| 2015/0350657 A1* | 12/2015 | Heo | H04N 19/157 375/240.12 |
| 2016/0050437 A1* | 2/2016 | Nam | H04N 19/597 375/240.12 |
| 2018/0199034 A1* | 7/2018 | Nam | H04N 19/82 |
| 2018/0324420 A1* | 11/2018 | Wang | H04N 19/103 |
| 2019/0230384 A1* | 7/2019 | Lee | H04N 19/117 |
| 2019/0268594 A1* | 8/2019 | Lim | H04N 19/19 |
| 2020/0267381 A1* | 8/2020 | Vanam | G06F 18/241 |
| 2022/0007052 A1* | 1/2022 | Filippov | H04N 19/105 |
| 2022/0109853 A1* | 4/2022 | Zhang | H04N 19/117 |

* cited by examiner

SYSTEM AND METHOD FOR APPLYING ADAPTIVE LOOP FILTER IN VIDEO CODING

CROSS REFERENCE TO RELATED APPLICATION

This application claims the benefit of priority under 35 USC § 119(e) to U.S. Application No. 63/141,627, filed on Jan. 26, 2021, entitled "METHODS AND SYSTEMS FOR ADAPTIVE LOOP FILTER APPLICATION IN VIDEO CODING," which is hereby incorporated by reference in its entirety.

TECHNICAL FIELD

The present disclosure relates to the field of video coding and compression, and more particularly relates to methods and systems for applying an adaptive loop filter (ALP) in video coding.

BACKGROUND

Various video coding techniques may be used to compress video data, such that coding on the video data can be performed using one or more video coding standards. Exemplary video coding standards may include, but not limited to, versatile video coding (VVC), joint exploration test model (JEM), high-efficiency video coding (H.265/HEVC), advanced video coding (H.264/AVC), moving picture expert group (MPEG) coding, or the like. The video coding may generally utilize a prediction method (e.g., inter-prediction, intra-prediction, or the like) that takes advantage of redundancy present in a sequence of image frames of a video. For example, by using the video coding, redundancy present in the image frames of the video can be reduced or removed from the video data. Thus, the video data can be compressed into a form with a lower bit rate, while avoiding or minimizing a quality degradation on the video.

SUMMARY

Embodiments of the disclosure provide a method for applying an adaptive loop filter in video coding. The method includes determining, by a video processor, a first rate-distortion cost of applying the adaptive loop filter on a reconstructed block. The reconstructed block includes a reconstructed version of an image block of an image frame from a video. The method may further include determining, by the video processor, a second rate-distortion cost of not applying the adaptive loop filter on the reconstructed block. The method may additionally include determining, by the video processor, whether to apply the adaptive loop filter for processing the reconstructed block based on the first rate-distortion cost and the second rate-distortion cost.

Embodiments of the disclosure also provide a system for applying an adaptive loop filter in video coding. The system includes a memory and a video processor. The memory is configured to store at least an image frame of a video. The image frame includes at least an image block, The video processor is configured to determine a first rate-distortion cost of applying the adaptive loop filter on a reconstructed block. The reconstructed block includes a reconstructed version of the image block. The video processor is further configured to determine a second rate-distortion cost of not applying the adaptive loop filter on the reconstructed block. The video processor is additionally configured to determine whether to apply the adaptive loop filter for processing the reconstructed block based on the first rate-distortion cost and the second rate-distortion cost.

Embodiments of the disclosure also provide a non-transitory computer-readable storage medium configured to store instructions which, when executed by a video processor, cause the video processor to perform a process for applying an adaptive loop filter in video coding. The process may include determining a first rate-distortion cost of applying the adaptive loop filter on a reconstructed block. The reconstructed block includes a reconstructed version of an image block of an image frame from a video. The process may further include determining a second rate-distortion cost of not applying the adaptive loop filter on the reconstructed block. The process may additionally include determining whether to apply the adaptive loop filter for processing the reconstructed block based on the first rate-distortion cost and the second rate-distortion cost.

Both the foregoing general description and the following detailed description are exemplary and explanatory only and are not restrictive of the invention, as claimed.

BRIEF DESCRIPTION OF THE DRAWINGS

FIG. 8A is a graphical representation illustrating an exemplary filter shape of an adaptive loop filter for a chroma component, according to embodiments of the disclosure.

FIG. 8B is a graphical representation illustrating an exemplary filter shape of an adaptive loop filter for a lama component, according to embodiments of the disclosure.

DETAILED DESCRIPTION

Figure 1A:
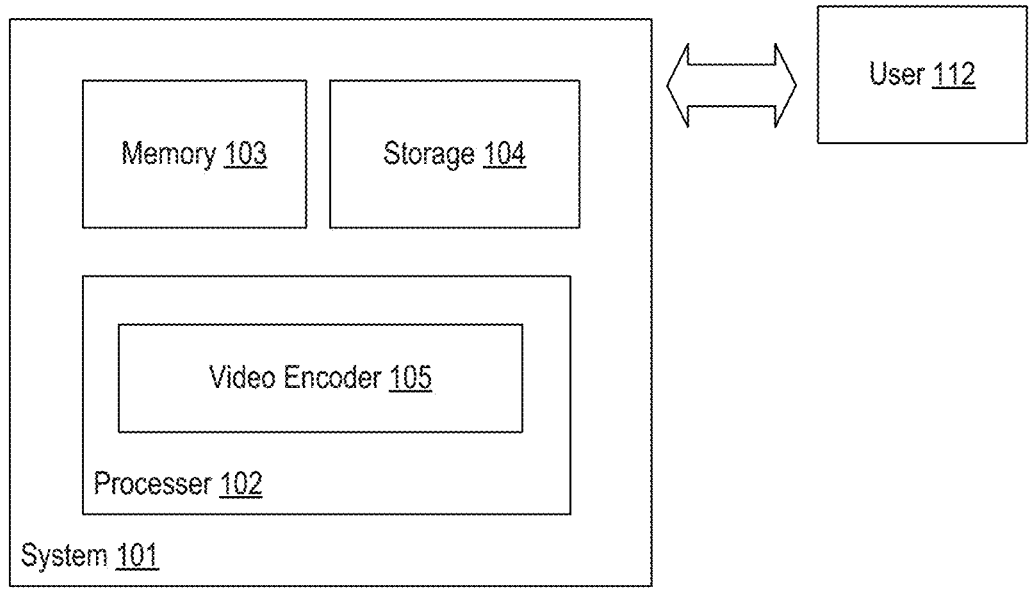
FIG. 1A illustrates a block diagram of an exemplary video encoding system for encoding video data, according to embodiments of the disclosure.

Reference will now be made in detail to the exemplary embodiments, examples of which are illustrated in the accompanying drawings, Wherever possible, the same reference numbers will be used throughout the drawings to refer to the same or like parts.

Like the HEVC standard, the VVC standard may be built upon a block-based hybrid video coding framework. The hybrid video coding framework may include an encoding system for encoding the video data at a transmitting side and a decoding system for decoding the video data at a receiving side. Each of the encoding system and the decoding system may include a respective adaptive loop filter. For example, the adaptive loop filter in the encoding system may be used to filter a reconstructed image block that corresponds to an input image block, such that the reconstructed image block can be stored in a reference image store and used to code future input image blocks. In another example, the adaptive loop filter in the decoding system may filter a reconstructed image block to generate an output image block, such that the output mage block can be sent out to drive a display device. The output image block may also be used to predict future output image blocks.

In the encoding system, coefficients of the adaptive loop filter can be obtained before encoding a current image frame of the video, and a turning-on or turning-off decision of the adaptive loop filter can be made during encoding of coding tree units (CTUs) in the current image frame. For each CTU, the turning-on or turning-off decision of the adaptive loop filter can be independently made for each color component. However, the application of the adaptive loop filter may have high computational complexity, especially for the decoding system which is sensitive to run time and power consumption.

Moreover, multiple encoding passes may be required to derive optimal coefficients for the adaptive loop filter. Each encoding pass may include operations such as collecting statistics for forming Wiener-Hopf equations and performing filtering operations with obtained coefficients. Rate-distortion costs of the multiple encoding passes can be respectively derived and compared with each other, and coefficients with a minimum cost from the rate distortion costs can be chosen for the adaptive loop filter. However, this multi-pass encoding may not be suitable for practical hardware encoder designs. For example, the measurement of each rate-distortion cost may require performing filtering operations for the entire image frame, resulting in an unacceptable amount of delay for hardware processing pipeline.

To address the aforementioned issues, a system and method for applying an adaptive loop filter in video coding are provided, such that ALF operations may be enabled only for CTUs and/or image frames where the ALF operations can provide rate-distortion improvements. For example, an adaptive loop filter may be applied in video coding if a first rate-distortion cost of applying the adaptive loop filter is smaller than a second rate-distortion cost of not applying the adaptive loop filter. In this case, a rate-distortion improvement can be achieved with the application of the adaptive loop filter. By controlling a turning on or off of the adaptive loop filter based on whether a rate-distortion improvement can be achieved with the application of the adaptive loop filter, the computational complexity associated with the application of the adaptive loop filter can be reduced for the video decoder while a coding efficiency associated with the adaptive loop filter can be maintained. Thus, an efficiency of the video coding can be improved.

Consistent with the present disclosure, coefficients of the adaptive loop filter may be determined based on a coding mode of an image frame, such that a low-delay encoding processing on the image frame can be achieved. For example, if the image frame is processed using an intra-coding mode, the coefficients of the adaptive loop filter can be determined from a set of predefined adaptive loop filters. If the image frame is processed using an inter-coding mode, the coefficients of the adaptive loop filter can be determined from the set of predefined adaptive loop filters or from historical coefficients associated with a previously-coded image frame. In this case, there is no need to perform the above-mentioned multi-pass encoding for a derivation of the coefficients, and so, potential delay incurred by the multi-pass encoding can be saved.

Consistent with the present disclosure, an image frame of a video disclosed herein may be expressed in a red, green, and blue (RGB) color space, and each pixel in the image frame may include a red pixel value, a green pixel value, and a blue pixel value. Alternatively, the image frame may be expressed in a YCbCr color space, where Y, Cb, and Cr denote a luma component, a blue-difference chroma component (referred to as a Cb chroma component), and a red-difference chroma component (referred to as a Cr chroma component), respectively. Each image block in the image frame may include, for example, a block of luma samples (e.g., an array of luma samples), a block of Cb chroma samples (e.g., an array of Cb chroma samples), and a block of Cr chroma samples (e.g., an array of Cr chroma samples). The YCbCr color space may be defined by a mathematical coordinate transformation from the RGB color space.

FIG. 1A illustrates a block diagram 100 of an exemplary video encoding system 101 for encoding video data, according to embodiments of the disclosure. In some embodiments, video encoding system 101 may be embodied on a device that a user 112 can interact with. For example, video encoding system 101 may be implemented on a server (e.g., a local server or a cloud server), a working station, a play station, a desktop computer, a laptop computer, a tablet computer, a smartphone, a game controller, a wearable electronic device, a television (TV) set, or any other suitable electronic device.

In some embodiments, video encoding system 101 may include at least one processor, such as a processor 102, at least one memory, such as a memory 103, and at least one storage, such as a storage 104. It is contemplated that video encoding system 101 may also include any other suitable components for performing functions described herein.

In some embodiments, video encoding system 101 may have different modules in a single device, such as an integrated circuit (IC) chip, or separate devices with dedicated functions. For example, the IC may be implemented as an application-specific integrated circuit (ASIC) or a field-programmable gate array (FPGA). In some embodiments, one or more components of video encoding system 101 may be located in a cloud computing environment or may be alternatively in a single location or distributed locations. Components of video encoding system 101 may be in an integrated device or distributed at different locations but communicate with each other through a network (not shown in the figure).

Processor 102 may include any appropriate type of microprocessor, graphics processor, digital signal processor, or microcontroller suitable for video coding. Processor 102 may include one or more hardware units (e.g., portion(s) of an integrated circuit) designed for use with other components or o execute part of a video coding program. The program may be stored on a computer-readable medium, and when executed by processor 102, it may perform one or more functions. Processor 102 may be configured as a separate processor module dedicated to performing video coding. Alternatively, processor 102 may be configured as a shared processor module for performing other functions unrelated to video coding.

In some embodiments, processor 102 can be a specialized processor customized for video coding. For example, processor 102 can be a graphics processing unit (GPU), which is a specialized electronic circuit designed to rapidly manipulate and alter memory to accelerate the creation of images in a frame buffer intended for output to a display device. Functions disclosed herein can be implemented by the GPU. In another example, video encoding system 101 can be implemented in a system on chip (SoC), and processor 102 may be a media and pixel processing (MPP) processor configured to run video encoder or decoder applications. In some embodiments, functions disclosed herein can be implemented by the MPP processor.

Processor 102 may include one or more modules, such as a video encoder 105. Although FIG. 1A shows that video encoder 105 is within one processor 102, it is contemplated that video encoder 105 may include one or more sub-modules that can be implemented on different processors located closely or remotely with each other.

Video encoder 105 (and any corresponding sub-modules or sub-units) can be hardware units (e.g., portions of an integrated circuit) of processor 102 designed for use with other components or software units implemented by processor 102 through executing at least part of a program, The program may be stored on a computer-readable medium, such as memory 103 or storage 104, and when executed by processor 102, it may perform one or more functions.

Memory 103 and storage 104 may include any appropriate type of mass storage provided to store any type of information that processor 102 may need to operate. For example, memory 103 and storage 104 may be a volatile or non-volatile, magnetic, semiconductor-based, tape-based, optical, removable, non-removable, or other type of storage device or tangible (i.e., non-transitory) computer-readable medium including, but not limited to, a ROM, a flash memory, a dynamic RAM, and a static RAM. Memory 103 and/or storage 104 may be configured to store one or more computer programs that may be executed by processor 102 to perform functions disclosed herein. For example, memory 103 and/or storage 104 may be configured to store program (s) that may be executed by processor 102 to perform video coding. Memory 103 and/or storage 104 may be further configured to store information and data used by processor 102.

Figure 1B:
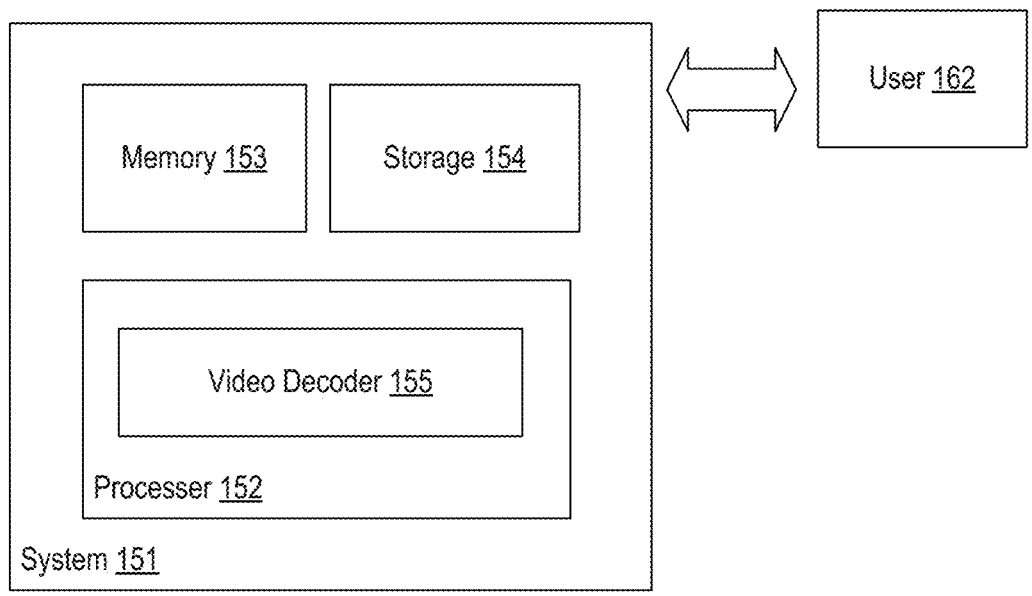
FIG. 1B illustrates a block diagram of an exemplary video decoding system for decoding video data, according to embodiments of the disclosure.

FIG. 1B illustrates a block diagram 150 of an exemplary video decoding system 151 for decoding video data, according to embodiments of the disclosure. In some embodiments, video decoding system 151 may be embodied on a device that a user 162 can interact with. Like video encoding system 101, video decoding system 151 may be implemented on a server (e.g., a local server or a cloud server), a working station, a play station, a desktop computer, a laptop computer, a tablet computer, a smartphone, a game controller, a wearable electronic device, a TV set, or any other suitable electronic device.

In some embodiments, video decoding system 151 may have a hardware structure and configuration similar to video encoding system 101. For example, video decoding system 151 may include at least one processor, such as a processor 152, at least one memory, such as a memory 153, and at least one storage, such as a storage 154. It is contemplated that video decoding system 151 may also include any other suitable components for performing functions described herein.

In some embodiments, video decoding system 151 may have different modules in a single device, such as an IC chip, or separate devices with dedicated functions. For example, the IC may be implemented as an ASIC or a FPGA. In some embodiments, one or more components of video decoding system 151 may be located in a cloud computing environment or may be alternatively in a single location or distributed locations. Components of video decoding system 151 may be in an integrated device or distributed at different locations but communicate with each other through a network (not shown in the figure).

Processor 152 may have a structure like that of processor 102, and the similar descriptions will not be repeated here. In some embodiments, processor 152 can be a specialized processor customized for video coding. For example, processor 152 can be a GPU or an MPP processor configured to run video encoder or decoder applications. Processor 152 may include one or more modules, such as a video decoder 155. Although FIG. 1B shows that video decoder 155 is within one processor 152, it is contemplated that video decoder 155 may include one or more sub-modules that can be implemented on different processors located closely or remotely with each other.

Similar to video encoder 105, video decoder 155 (and any corresponding sub-modules or sub-units) can be hardware units (e.g., portions of an integrated circuit) of processor 152 designed for use with other components or software units implemented by processor 152 through executing at least part of a program. The program may be stored on a computer-readable medium, such as memory 153 or storage 154, and when executed by processor 152, it may perform one or more functions.

Memory 153 and storage 154 may have structures like those of memory 103 and storage 104, respectively, and the similar descriptions will not be repeated here.

Figure 2A:
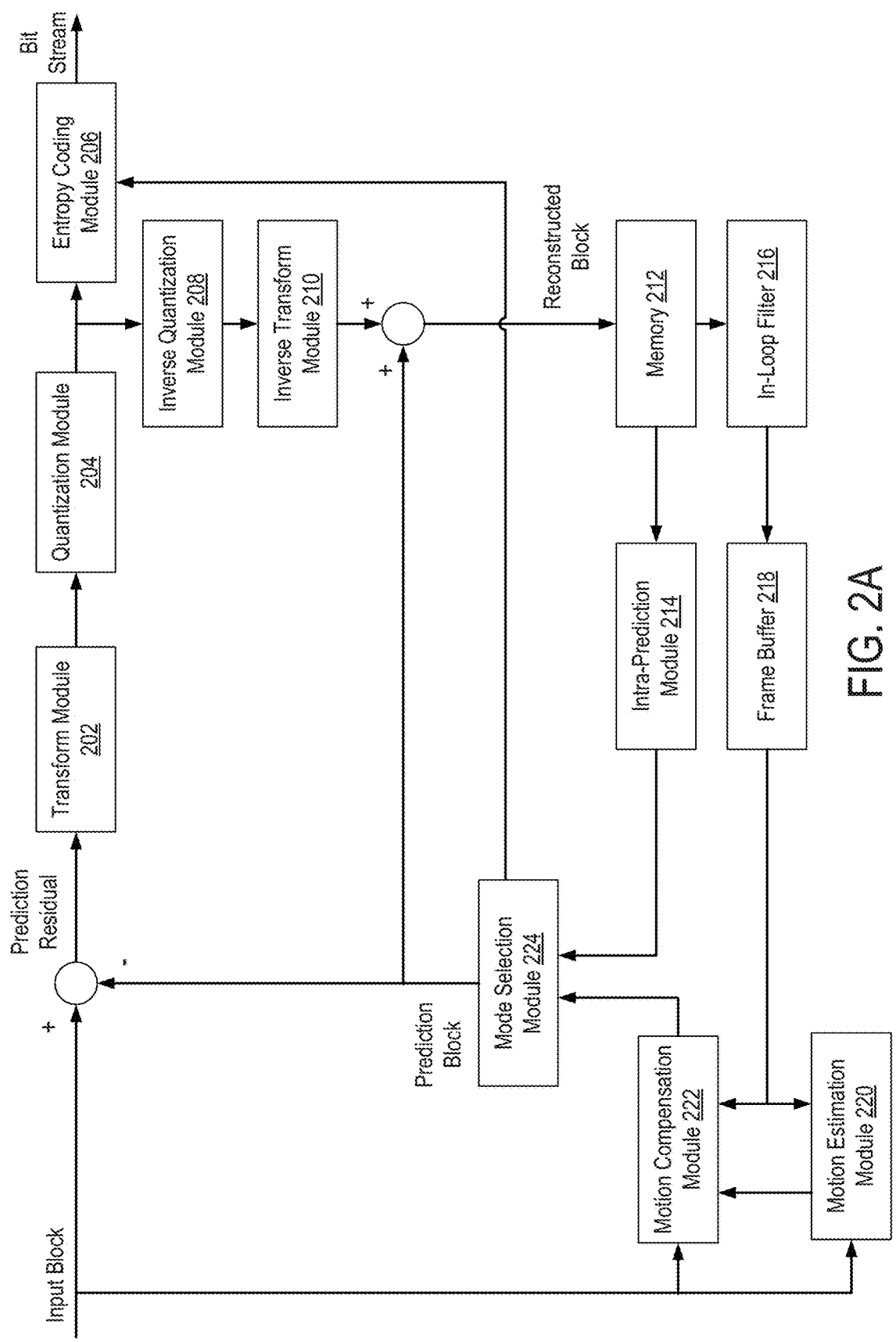
FIG. 2A illustrates a block diagram of an exemplary video encoder including an in-loop filter, according to embodiments of the disclosure.

FIG. 2A illustrates a block diagram of an exemplary video encoder (e.g., video encoder 105) including an in-loop filter, according to embodiments of the disclosure. Video encoder 105 may have a generic block-based hybrid video encoding structure for the VCC standard. A reference software codebase, referred to as a VCC test model (VTM), can be established for demonstrating a reference implementation of the VCC standard. In video encoder 105, each image frame of an input video may be processed block by block (also referred to as coding units (CUs)). In VTM-1.0, a coding unit can include up to 128×128 pixels. However, different from the HEVC standard which partitions blocks only based on a quad-tree structure, in the VVC standard a coding tree unit (CTU) may be split into coding units to adapt to varying local characteristics based on a quad-tree, binary-tree or ternary-tree structure.

In the VCC standard, a coding tree block (CTB) may include a block of N×N samples (e.g., N being a positive integer). For example, for an image frame that has three sample arrays (e.g., an array of luma samples and two arrays of chroma samples), a coding tree unit may include a coding tree block of luma samples (e.g., a block of N×N luma samples) and two corresponding coding tree blocks of chroma samples (e.g., a block of N×N Cb chroma samples and a block of N×N Cr chroma samples). In another example, for a monochrome image frame or an image frame that is coded using three separate color planes and syntax structures used to code the samples, a coding tree unit may include a coding tree block of samples of the image frame.

Additionally, the concept of multiple types of partition units in the HEVC standard is removed from the VCC standard. For example, in the HEVC standard, a coding unit is different from a prediction unit used in a prediction operation and a transform unit used in a transform operation. However, in the VCC standard, the separation of the coding unit, the prediction unit, and the transform unit does not exist anymore. Instead, each coding unit can be used as a basic unit for both the prediction and transform operations without further partitioning of the coding unit. In a multi-type tree structure of the VCC standard, a coding tree unit can be firstly partitioned by a quad-tree structure. Then, each quad-tree leaf node can be further partitioned by a binary-tree or ternary-tree structure.

In some embodiments, video encoder 105 may be configured to receive an input block from an image frame of a video and encode the input block to produce a bit stream corresponding to the input block. The input block can be a two-dimensional (2D) image block of the image frame. For example, the input block may include a coding tree unit, a coding tree block, or a coding unit of samples of the image frame. The samples can include luma samples, chroma samples, or both, of the image frame. The image frame may be divided into a plurality of input blocks such that video encoder 105 may process the image frame block by block.

In some embodiments, video encoder 105 may include one or more of a transform module 202, a quantization module 204, an entropy coding module 206, an inverse quantization module 208, an inverse transform module 210, a memory 212, an intra-prediction module 214, an in-loop filter 216, a frame buffer 218, a motion estimation module 220, a motion compensation module 222, and a mode selection module 224.

In some embodiments, intra-prediction module 214 may perform a spatial prediction operation (also referred to as an intra-prediction operation) to generate a predicted spatial block that corresponds to the input block. It is noted that the term "intra-prediction" and the term "spatial prediction" may be used interchangeably in the disclosure if no ambiguity is incurred. For example, intra-prediction module 214 may retrieve spatial reference samples for the input block from memory 212, where the spatial reference samples may include samples of one or more already-coded neighboring blocks in the same image frame (or the same slice) as the input block. Intra-prediction module 214 may use pixels from the spatial reference samples to generate a predicted spatial block for the input block. The predicted spatial block may represent a spatial prediction of the input block based on the spatial reference samples. Through an application of the spatial prediction operation, spatial redundancy present in the video data can be reduced, Thus, a coding efficiency of the video data can be improved.

It is noted that a basic intra-prediction scheme applied in the VVC standard is kept the same as that of the HEVC standard, except that several modules or operations in the HEVC standard are further extended and/or improved in the VCC standard, For example, an intra-sub-partition (ISP) coding mode, an extended intra-prediction with wide-angle intra directions, a position-dependent intra-prediction combination (PDPC) operation, a matrix-based intra-prediction operation, and 4-tap intra-interpolation operation in the HEVC standard are extended and improved in the VCC standard.

In some embodiments, motion compensation module 222 may cooperate with motion estimation module 220 to perform a temporal prediction operation to generate a predicted temporal block that corresponds to the input block. The temporal prediction operation may also be referred to as an inter-prediction operation or a motion-compensated prediction operation. It is noted that the term "inter-prediction" and the term "temporal prediction" may be used interchangeably in the disclosure if no ambiguity is incurred.

For example, motion compensation module 222 may retrieve one or more temporal reference frames from frame buffer 218. The one or more temporal reference frames may include one or more previously-coded image frames in the same video as the image frame. Motion compensation module 222 may use reconstructed pixels from the one or more temporal reference frames to generate a predicted temporal block for the input block. The predicted temporal block may represent a temporal prediction of the input block based on the one or more temporal reference image frames. Through an application of the temporal prediction operation, temporal redundancy present in the video data can be reduced. Thus, a coding efficiency of the video data can also be improved.

In some embodiments, the temporal prediction operation for the input block (e.g., the input block being a coding unit) may be signaled by one or more motion vectors of the input block generated by motion estimation module 220. The one or more motion vectors may indicate an amount and a direction of motion between the input block and the one or more temporal reference frames. If multiple temporal reference frames are applied in the temporal prediction operation, a reference image index may be additionally signaled. The reference image index may be used to identify the temporal reference frames stored in frame buffer 218.

After an execution of the spatial prediction operation and/or the temporal prediction operation, mode selection module 224 may select a prediction mode for the input block. For example, mode selection module 224 may select the prediction mode based on a rate-distortion optimization method. Mode selection module 224 may determine a prediction block for the input block based on the prediction mode. For example, the prediction mode may be an intra-coding mode (also referred to as a spatial prediction mode), and the prediction block can be the predicted spatial block. Alternatively, the prediction mode may be an inter-coding mode (also referred to as a temporal prediction mode), and the prediction block can be the predicted temporal block.

Next, the prediction block can be subtracted from the input block to generate a prediction residual. The prediction residual may be de-correlated through a transform operation performed by transform module 202 and a quantization operation performed by quantization module 204 to generate quantized residual coefficients.

The quantized residual coefficients may be inversely quantized by inverse quantization module 208 and inversely transformed by inverse transform module 210 to form a reconstructed residual. Inverse quantization module 208 and inverse transform module 210 may perform operations inverse to those performed by transform module 202 and quantization module 204, respectively. The reconstructed residual may then be added back to the prediction block to form a reconstructed block that corresponds to the input block. For example, the reconstructed block may include a reconstructed version of the input block. The reconstructed block may be stored in memory 212. The reconstructed block may be further processed by in-loop filter 216. In-loop filter 216 is described below in more detail with reference to FIG. 2C. After being processed by in-loop filter 216, the reconstructed block may be stored in frame buffer 218 and used to code future input blocks.

Entropy coding module 206 may form a bit stream as an output of video encoder 105 based on one or more entropy coding inputs. For example, entropy coding module 206 may compress and pack the one or more entropy coding inputs to generate a bit stream as an output. The one or more entropy coding inputs may include the quantized residual coefficients and the coding mode (e.g., an inter-coding or intra-coding mode) of the input block. If the coding mode is the inter-coding mode, the one or more entropy coding inputs may further include motion vector information describing one or more motion vectors of the input block and the reference image index used to identify the one or more temporal reference frames. If the coding mode is the intra-coding mode, the one or more entropy coding inputs may further include a spatial index for identifying the spatial reference samples used in the intra-coding of the input block.

Figure 2B:
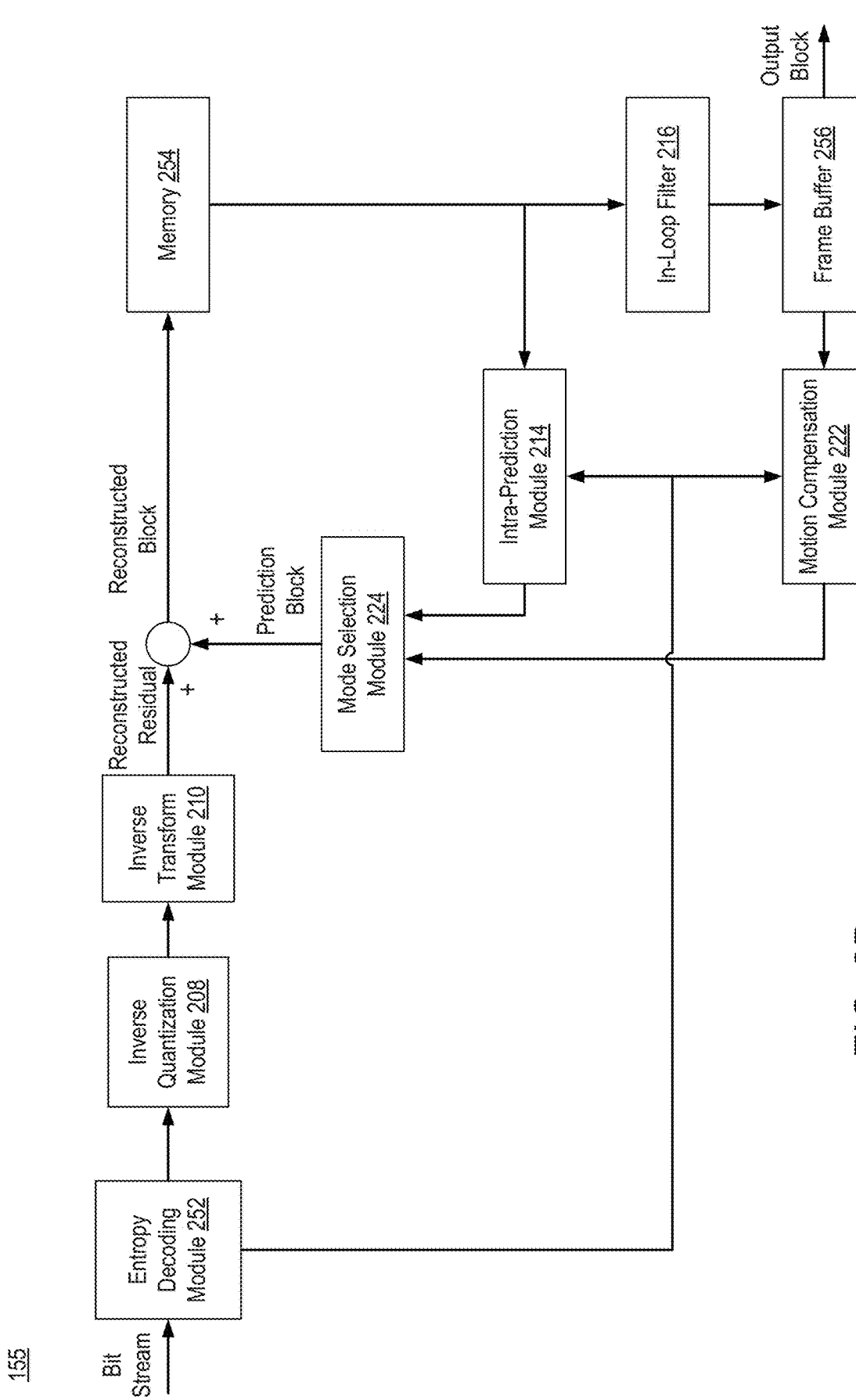
FIG. 2B illustrates a block diagram of an exemplary video decoder including an in-loop filter, according to embodiments of the disclosure.

FIG. 2B illustrates a block diagram of an exemplary video decoder (e.g., video decoder 155) including an in-loop filter, according to embodiments of the disclosure. Video decoder 155 may be a block-based video decoder. Video decoder 155 may receive the bit stream sent by video encoder 105 of FIG. 2A and use the bit stream to generate an output block corresponding to the input block of FIG. 2A. Video decoder 155 may include one or more of an entropy decoding module 252, inverse quantization module 208, inverse transform module 210, a memory 254, intra-prediction module 214, mode selection module 224, in-loop filter 216, frame buffer 256, and motion compensation module 22.

In some embodiments, entropy decoding module 252 may decode the bit stream to generate one or more entropy decoding outputs. The one or more entropy decoding outputs may include the quantized residual coefficients and the coding mode of the input block. Entropy decoding module 252 may output the quantized residual coefficients to inverse quantization module 208.

If the coding mode is the inter-coding mode, the one or more entropy decoding outputs may further include motion vector information describing one or more motion vectors of the input block and a reference image index identifying one or more temporal reference frames used in the inter-coding of the input block. Entropy decoding module 252 may further output the motion vector information and the reference image index to motion compensation module 222. Motion compensation module 222 may retrieve the one or more temporal reference frames from frame buffer 256 based on the reference image index. Motion compensation module 222 may use reconstructed pixels from the one or more temporal reference frames to generate a predicted temporal block based on the motion vector information.

If the coding mode is the intra-coding mode, the one or more entropy decoding outputs may further include a spatial index for identifying spatial reference samples used in the intra-coding of the input block. Entropy decoding module 252 may further output the spatial index to intra-prediction module 214. Intra-prediction module 214 may retrieve the spatial reference samples from memory 254 based on the spatial index. Intra-prediction module 214 may use pixels from the spatial reference samples to generate a predicted spatial block.

Mode selection module 224 may generate a prediction block based on the one or more entropy decoding outputs. For example, if the coding mode included in the one or more entropy decoding outputs is the inter-coding mode, mode selection module 224 may determine a prediction block for the bit stream to be the predicted temporal block from motion compensation module 222. If the coding mode is the intra-coding mode, mode selection module 224 may determine a prediction block for the bit stream to be the predicted spatial block from intra-prediction module 214.

The quantized residual coefficients may be inversely quantized by inverse quantization module 208 and inversely transformed by inverse transform module 210 to form a reconstructed residual. The reconstructed residual may then be added back to the prediction block to form a reconstructed block that corresponds to the bit stream. The reconstructed block may be stored in memory 254. The reconstructed block may be used by intra-prediction module 214 for future intra-prediction processing. The reconstructed block may be further processed by in-loop filter 216. After being processed by in-loop filter 216, the reconstructed block may be stored in frame buffer 256 for future inter-prediction processing. The reconstructed block may also be sent out as an output block to drive a display device.

Figure 2C:
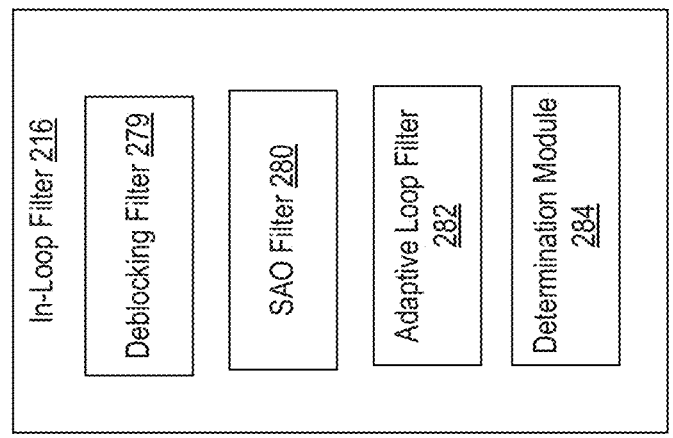
FIG. 2C illustrates a block diagram of an exemplary in-loop filter including an adaptive loop filter, according to embodiments of the disclosure.

FIG. 2C illustrates a block diagram of an exemplary in-loop filter (e.g., in-loop filter 216 of FIG. 2A or FIG. 2B) including an adaptive loop filter, according to embodiments of the disclosure. In-loop filter 216 may be configured to process a reconstructed block to generate a processing result and may store the processing result in frame buffer 218 or 256. The reconstructed block may correspond to an image block of an image frame, and may include a reconstructed version of the image block. For example, the image block may be the input block of FIG. 2A or 2B, and the reconstructed block may be a reconstructed version of the input block. In-loop filter 216 may include one or more of a deblocking filter 279, a sample adaptive offset (SAO) filter 280, and an adaptive loop filter 282.

Deblocking filter 279 may be a video filter applied to the reconstructed block to improve visual quality and prediction performance by smoothing sharp edges formed at boundaries of the reconstructed block. For example, deblocking filter 279 may be configured to modify samples of the reconstructed block located at block boundaries to reduce blocking artifacts due to block-based coding. After the reconstructed block is filtered by deblocking filter 279, SAO filter 280 may be configured to modify samples of the reconstructed block by conditionally adding an offset value to each sample of the reconstructed block.

Adaptive loop filter 282 is adaptive in the sense that coefficients of the filter are signaled in the bit stream and can be designed based on image content and distortion of the reconstructed block. Adaptive loop filter 282 may be applied to reduce distortion introduced by the encoding process and improve the quality of the reconstructed block. Adaptive loop filter 282 may include at least one of a luma adaptive loop filter, a Cb-component chroma adaptive loop filter, a Cr-component chroma adaptive loop filter, or a cross-component adaptive loop filter. Further description of adaptive loop filter 282 may be provided below with reference to FIGS. 4-11.

In some embodiments, in-loop filter 216 may further include a determination module 284 configured to determine whether to apply adaptive loop filter 282 in video coding.

For example, determination module 284 may be configured to make an on/off decision of adaptive loop filter 282 for the reconstructed block based on a rate-distortion evaluation criterion.

Specifically, determination module 284 may determine a first rate-distortion cost of applying adaptive loop filter 282 on the reconstructed block. For example, determination module 284 may determine a first distortion of applying adaptive loop filter 282 on the reconstructed block and a rate of applying adaptive loop filter 282 on the reconstructed block. Determination module 284 may determine the first rate-distortion cost based on the first distortion and the rate of applying adaptive loop filter 282 on the reconstructed block. For example, determination module 284 may determine the first rate-distortion cost based on the following expression (1):

$$Cost_{on} = D_{on} + \lambda \times R_{on} \quad (1)$$

In the above expression (1), $Cost_{on}$ denotes the first rate-distortion cost, $D_{on}$ denotes the first distortion of applying adaptive loop filter 282 on the reconstructed block, $R_{on}$ denotes the rate of applying adaptive loop filter 282 on the reconstructed block, and $\lambda$ denotes a rate distortion factor. The first distortion $D_{on}$ may be a distortion of an ALF-filtered image block versus an original image block in the image frame. The ALF-filtered image block may be generated by filtering the reconstructed block using adaptive loop filter 282. The original image block may be an image block of the image frame corresponding to the reconstructed block. The rate distortion factor $\lambda$ may include a value determined by a quantization parameter.

Next, determination module 282 may determine a second rate-distortion cost of not applying adaptive loop filter 282 on the reconstructed block. For example, determination module 284 may determine a second distortion of not applying adaptive loop filter 282 on the reconstructed block and a rate of not applying adaptive loop filter 282 on the reconstructed block. Determination module 284 may determine the second rate-distortion cost based on the second distortion and the rate of not applying adaptive loop filter 282 on the reconstructed block. For example, determination module 284 may determine the second rate-distortion cost based on the following expression (2):

$$Cost_{off} = D_{off} + \lambda \times R_{off} \quad (2)$$

In the above expression (2), $Cost_{off}$ denotes the second rate-distortion cost, $D_{off}$ denotes a second distortion of not applying adaptive loop filter 282 on the reconstructed block, and $R_{off}$ denotes a rate of not applying adaptive loop filter 282 on the reconstructed block. The second distortion may be a distortion of the reconstructed block (without applying adaptive loop filter 282) versus the original image block in the image frame.

Determination module 284 may determine whether to apply adaptive loop filter 282 for processing the reconstructed block based on the first rate-distortion cost and the second rate-distortion cost. For example, determination module 284 may determine whether the first rate-distortion cost is smaller than the second rate-distortion cost. Responsive to the first rate-distortion cost being smaller than the second rate-distortion cost, determination module 284 may determine to apply adaptive loop filter 282 for processing the reconstructed block. Otherwise, determination module 284 may determine not to apply adaptive loop filter 282 on the reconstructed block. That is, the reconstructed block can be set as ALF enabled when a value of $Cost_{on}$ is smaller than a value of $Cost_{off}$, as shown in the following expression (3):

$$\begin{cases} ALF \text{ is set as on(enabled)} & Cost_{on} < Cost_{off} \\ ALF \text{ is set as on(enabled)} & \text{Otherwise} \end{cases} \quad (3)$$

In another example, determination module 284 may further determine whether the first rate-distortion cost is smaller than a first threshold. Responsive to the first rate-distortion cost being smaller than the second rate-distortion cost and the first rate-distortion cost being smaller than the first threshold, determination module 284 may determine to apply adaptive loop filter 282 for processing the reconstructed block. Otherwise, determination module 284 may determine not to apply adaptive loop filter 282 on the reconstructed block. That is, an additional condition related to the first rate-distortion cost $Cost_{on}$ may be checked to determine whether to enable the ALF operation for the reconstructed block, as shown in the following expression (4):

$$\begin{cases} ALF \text{ is set as on(enabled)} & Cost_{on} < Cost_{off} \text{ and } Cost_{on} < T_1 \\ ALF \text{ is set as on(enabled)} & \text{Otherwise} \end{cases} \quad (4)$$

In the above expression (4), $T_1$ denotes the first threshold, which can be predefined by video encoder 105 or a user.

In still another example, determination module 284 may further determine whether a cost difference between the second rate-distortion cost and the first rate-distortion cost is greater than a second threshold. Responsive to the first rate-distortion cost being smaller than the second rate-distortion cost and the cost difference being greater than the second threshold, determination module 284 may determine to apply adaptive loop filter 282 for processing the reconstructed block. Otherwise, determination module 284 may determine not to apply adaptive loop filter 282 on the reconstructed block. That is, an additional condition related to a difference between the second rate-distortion cost $Cost_{off}$ and the first rate-distortion cost $Cost_{on}$ may be checked to determine whether to enable the ALF operation for the reconstructed block, as shown in the following expression (5):

$$\begin{cases} ALF \text{ is set as on(enabled)} & Cost_{on} < Cost_{off} \text{ and } \Delta Cost > T_2 \\ ALF \text{ is set as on(enabled)} & \text{Otherwise} \end{cases} \quad (5)$$

In the above expression (5), $\Delta Cost$ denotes the cost difference and can be calculated as $Cost_{off} - Cost_{on}$, and $T_2$ denotes the second threshold, which can be predefined by video encoder 105 or a user.

In yet another example, determination module 284 may determine a distortion difference associated with the reconstructed block as a difference between the second distortion and the first distortion. Determination module 284 may further determine whether the distortion difference is greater than a third threshold. Responsive to the first rate-distortion cost being smaller than the second rate-distortion cost and the distortion difference being greater than the third threshold, determination module 284 may determine to apply the adaptive loop filter for processing the reconstructed block. Otherwise, determination module 284 may determine not to apply adaptive loop filter 282 on the reconstructed block. That is, an additional condition related to a difference between the second distortion $D_{off}$ and the first distortion $D_{on}$ may be checked to determine whether to enable the ALF operation for the reconstructed block, as shown in the following expression (6):

$$\begin{cases} ALF \text{ is set as on(enabled)} & Cost_{on} < Cost_{off} \text{ and } \Delta D > T_3 \\ ALF \text{ is set as on(enabled)} & \text{Otherwise} \end{cases} \quad (6)$$

In the above expression (6), $\Delta D$ denotes the distortion difference and can be calculated as $D_{off} - D_{on}$, and $T_3$ denotes the third threshold, which can be predefined by video encoder 105 or a user.

In some embodiments, a total number of reconstructed blocks in the same image frame to apply adaptive loop filter 282 (e.g., a total number of ALF enabled image blocks in the same image frame, denoted as TotalNum) may not exceed a fourth threshold $T_4$. In this case, complexity incurred by the application of adaptive loop filter 282 can be set below an expected level for a given image frame.

In some embodiments, a total area size of reconstructed blocks in the same image frame to apply adaptive loop filter 282 (e.g., a total area size of ALF enabled image blocks in the same image frame, denoted as TotalSize) may not exceed a fifth threshold $T_5$. In this case, complexity incurred by the application of adaptive loop filter 282 can also be set below an expected level for a given image frame.

In some embodiments, each of the first, second, third, fourth, and fifth thresholds $T_1$, $T_2$, $T_3$, $T_4$, $T_5$ (denoted as $T_i$ with i being an integer, $1 \leq i \leq 5$) may vary at a frame-sequence level, an image frame level, a slice level, a coding tree block level, and/or any predefined region level. For example, for each threshold $T_i$ varying at a frame-sequence level, different values may be set for the threshold $T_i$ with respect to different videos, while the threshold $T_i$ may have the same value for a sequence of image frames in the same video. In another example, for each threshold $T_i$ varying at an image frame level, different values may be set for the threshold $T_i$ with respect to different image frames in the same video, while the threshold $T_i$ may have the same value for each image frame in the same video. In still another example, for each threshold $T_i$ varying at a slice level (or a coding tree block level), different values may be set for the threshold $T_i$ with respect to different slices (or different coding tree blocks) in the same image frame, while the threshold $T_i$ may have the same value for each slice (or each coding tree block) in the same image frame.

In some examples, different values may be set for the threshold $T_i$ with respect to image frames with different temporal layer IDs (which may be related to the nuh_temporal_id_plus1 specified in the VVC or HEVC specification). Alternatively, a value of the threshold $T_i$ may be determined based on one or more quantization parameter (QP) values used at a frame-sequence level, an image frame level, a slice level, a coding tree block level, and/or any predefined region level.

As described above, each threshold $T_i$ (with $1 \leq i \leq 5$) may be used to compare with a parameter $P_i$ (such as $P_i = Cost_{on}$, $\Delta Cost$, $\Delta D$, TotalNum, or TotalSize for $1 \leq i \leq 5$, respectively). In some embodiments, multiple values of the parameter $P_i$ with respect to a particular predefined region level (e.g., a slice level, a coding tree block level, etc.) can be sorted by an ascending order or a descending order to generate a sorted data sequence. The value of the threshold $T_i$ can be set to be equal to the data that corresponds to the first $N_i$ percent of the sorted data sequence.

For example, when $T_1$ is used as an upper threshold to compare with $P_1$ ($Cost_{on}$), multiple values of $Cost_{on}$ calculated from multiple reconstructed blocks may be sorted in an ascending order to generate a sorted data sequence. The value of the threshold $T_1$ can be set to be equal to the data that corresponds to the first $N_1$ percent of the sorted data sequence. For example, 100 $Cost_{on}$ data associated with 100 reconstructed blocks may be sorted in an ascending order to generate a sorted data sequence of $Cost_{on}$ data, and if $N_1=30$, the $30^{th}$ data value in the sorted data sequence can be used as the threshold $T_1$.

In another example, when $T_2$ (or $T_3$) is used as a lower threshold to compare with $P_2$ ($\Delta Cost$) (or $P_3$ ($\Delta D$)), multiple values of $\Delta Cost$ (or multiple values of $\Delta D$) calculated from multiple reconstructed blocks may be sorted by a descending order to generate a sorted data sequence. The value of the threshold $T_2$ (or $T_3$) can be set to be equal to the data that corresponds to the first $N_2$ (or $N_3$) percent of the sorted data sequence. For example, 100 $\Delta Cost$ data associated with 100 reconstructed blocks may be sorted in a descending order to generate a sorted data sequence. If $N_2=40$, the $40^{th}$ data value in the sorted data sequence can be used as the threshold $T_2$.

In still another example, when $T_4$ (or $T_5$) is used as an upper threshold to compare with $P_4$ (TotalNum) (or $P_5$ (TotalSize)), multiple values of TotalNum (or multiple values of TotalSize) calculated from multiple image frames may be sorted by an ascending order to generate a sorted data sequence. The value of the threshold $T_4$ (or $T_5$) can be set to be equal to the data that corresponds to the first $N_4$ (or $N_5$) percent of the sorted data sequence.

It is contemplated that $N_i$ (with $1 \leq i \leq 5$) may vary at a frame-sequence level, an image frame level, a slice level, a coding tree block level, and/or any predefined region level. For example, different values may be set for $N_i$ for image frames with different temporal layer IDs. Alternatively, a value of $N_i$ may be determined based on one or more quantization parameter values used at a frame-sequence level, an image frame level, a slice level, a coding tree block level, and/or any predefined region level.

In some embodiments, the value of the threshold $T_i$ may be determined further based on a video resolution of the video. The video resolution may include a temporal resolution (e.g., a frame rate) of the video, a spatial resolution (e.g., a width and a height of the image frame) of the video, or both.

In some embodiments, determination module 284 may be further configured to determine one or more coefficients of adaptive loop filter 282 such that a low-delay encoding processing may be achieved in video encoder 105. For example, if the image frame is processed using an intra-coding mode, determination module 284 may determine coefficients of adaptive loop filter 282 from a set of predefined adaptive loop filters. The set of predefined adaptive loop filters is described below in more detail. In another example, if the image frame is processed using an inter-coding mode, determination module 284 may determine coefficients of adaptive loop filter 282 from the set of predefined adaptive loop filters or from historical coefficients associated with a previously-coded image frame. The historical coefficients associated with the previously-coded image frame may include coefficients of adaptive loop filter 282 used to process the previously-coded image frame.

Figure 3:
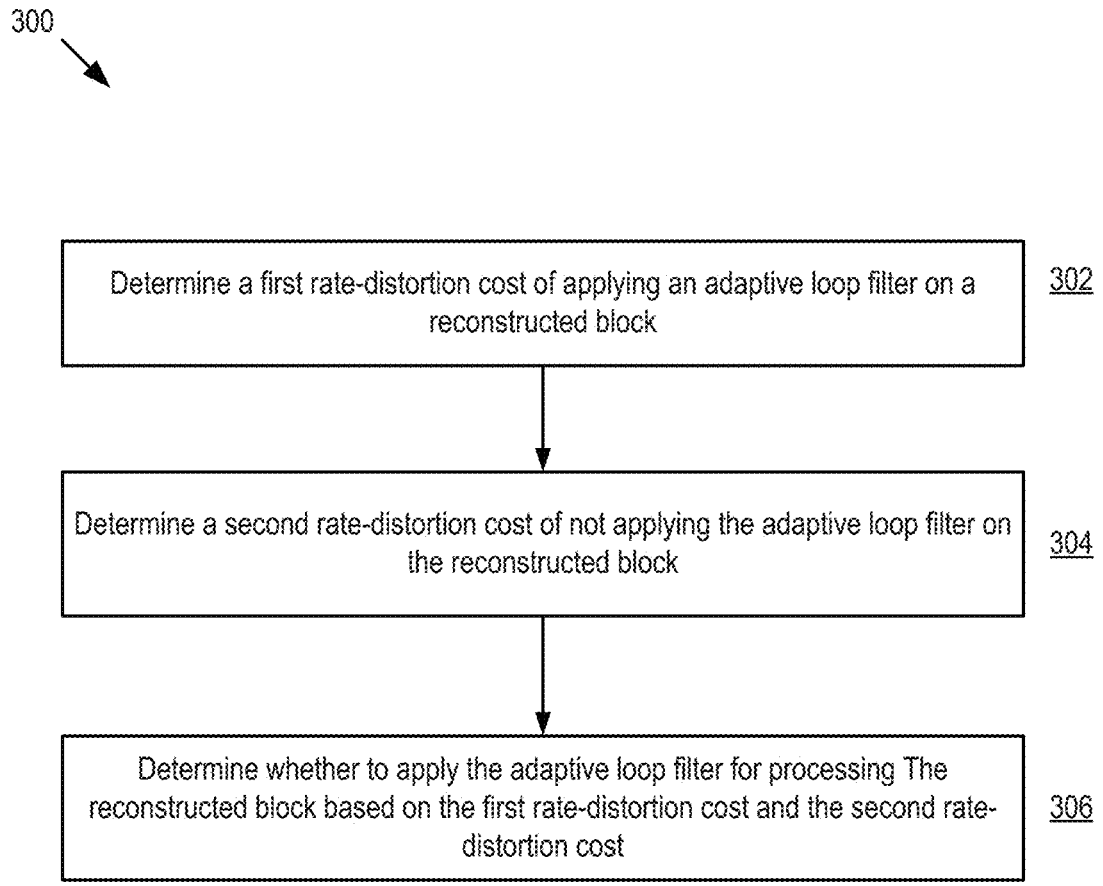
FIG. 3 is a flow chart of an exemplary method for applying an adaptive loop filter in video coding, according to embodiments of the disclosure.

FIG. 3 is a flow chart of an exemplary method 300 for applying an adaptive loop filter in video coding, according to embodiments of the disclosure. Method 300 may be implemented by video encoder 105, specifically determination module 284, and may include steps 302-306 as described below. Some of the steps may be optional to perform the disclosure provided herein. Further, some of the steps may be performed simultaneously, or in a different order than shown in FIG. 3.

In step 302, determination module 284 may determine a first rate-distortion cost of applying an adaptive loop filter on a reconstructed block. The reconstructed block may include a reconstructed version of an image block of an image frame. For example, determination module 284 may determine a first distortion of applying the adaptive loop filter on the reconstructed block and a rate of applying the adaptive loop filter on the reconstructed block. Determination module 284 may determine the first rate-distortion cost based on the first distortion and the rate of applying the adaptive loop filter on the reconstructed block.

In step 304, determination module 284 may determine a second rate-distortion cost of not applying the adaptive loop filter on the reconstructed block. For example, determination module 284 may determine a second distortion of not applying the adaptive loop filter on the reconstructed block and a rate of not applying the adaptive loop filter on the reconstructed block. Determination module 284 may determine the second rate-distortion cost based on the second distortion and the rate of not applying the adaptive loop filter on the reconstructed block.

In step 306, determination module 284 may determine whether to apply the adaptive loop filter for processing the reconstructed block based on the first rate-distortion cost and the second rate-distortion cost. For example, determination module 284 may compare the first rate-distortion cost with the second rate-distortion cost to generate a comparison result. Determination module 284 may determine whether to apply the adaptive loop filter for processing the reconstructed block based on the comparison result.

Figure 4:
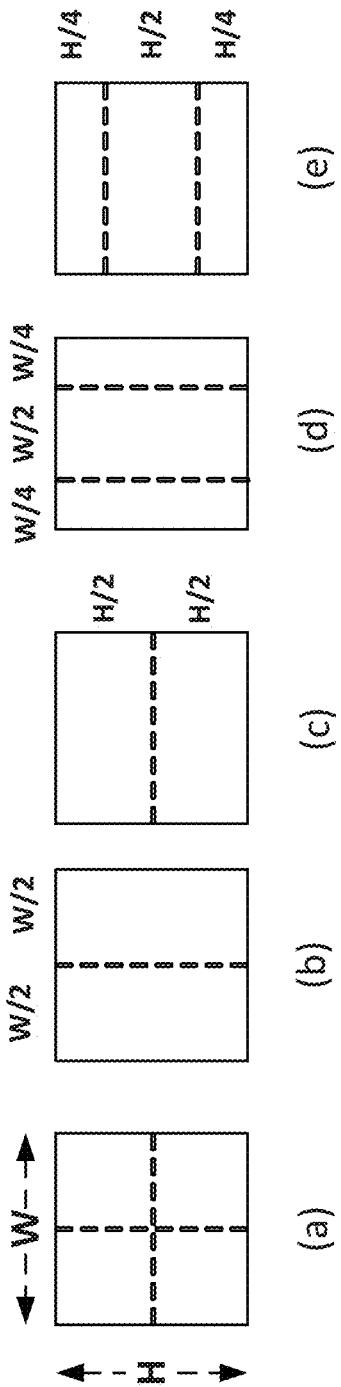
FIG. 4 is a graphical representation illustrating exemplary block partitions in a multi-type tree structure, according to embodiments of the disclosure.

FIG. 4 is a graphical representation illustrating exemplary block partitions 400 in a multi-type tree structure, according to embodiments of the disclosure. Each image block in FIG. 4 has a size of H×W, where H and W denote a height and a width of the image block, respectively. Section (a) of FIG. 4 shows an exemplary quaternary partition of a first image block. Section (b) of FIG. 4 shows an exemplary vertical binary partition of a second image block. Section (c) of FIG. 4 shows an exemplary horizontal binary partition of a third image block. Section (d) of FIG. 4 shows an exemplary vertical ternary partition of a fourth image block. Section (e) of FIG. 4 shows an exemplary horizontal ternary partition of a fifth image block.

Figure 5:
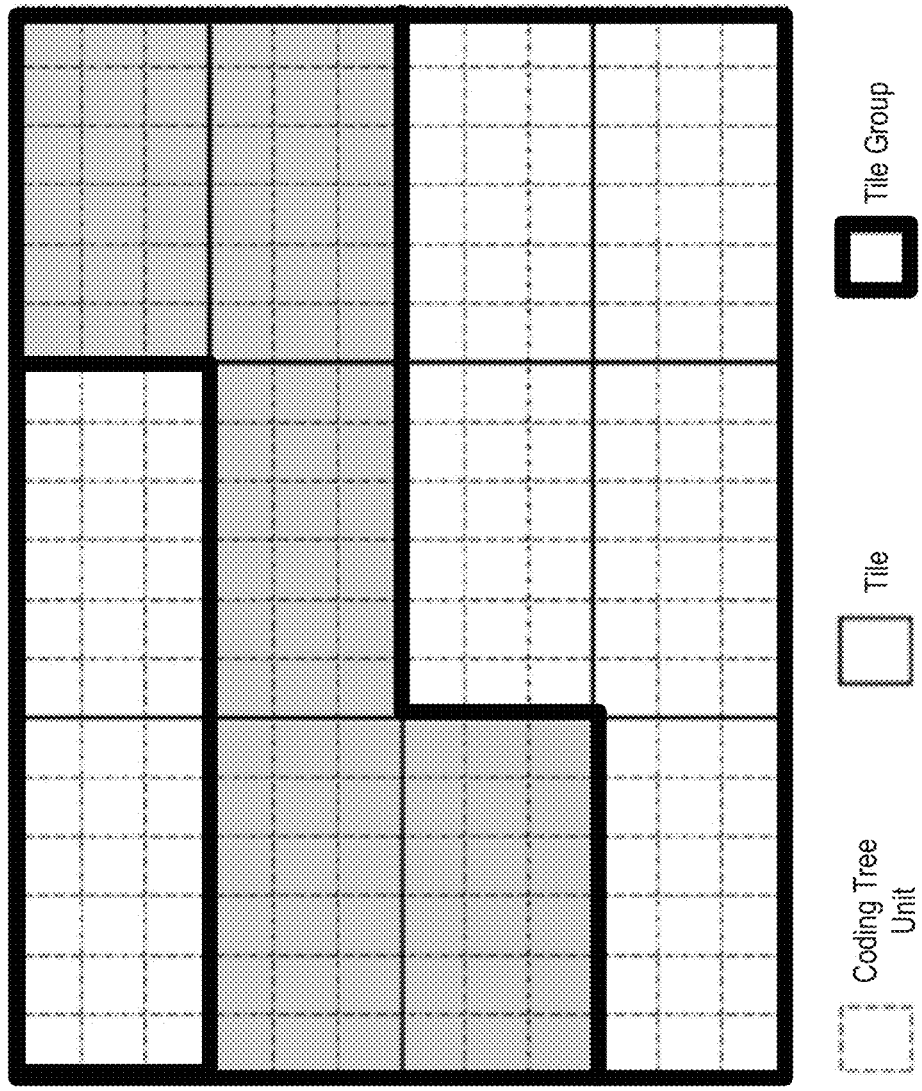
FIG. 5 is a graphical representation illustrating an exemplary partitioning of an image frame in a raster-scan tile group mode, according to embodiments of the disclosure.
Figure 6:
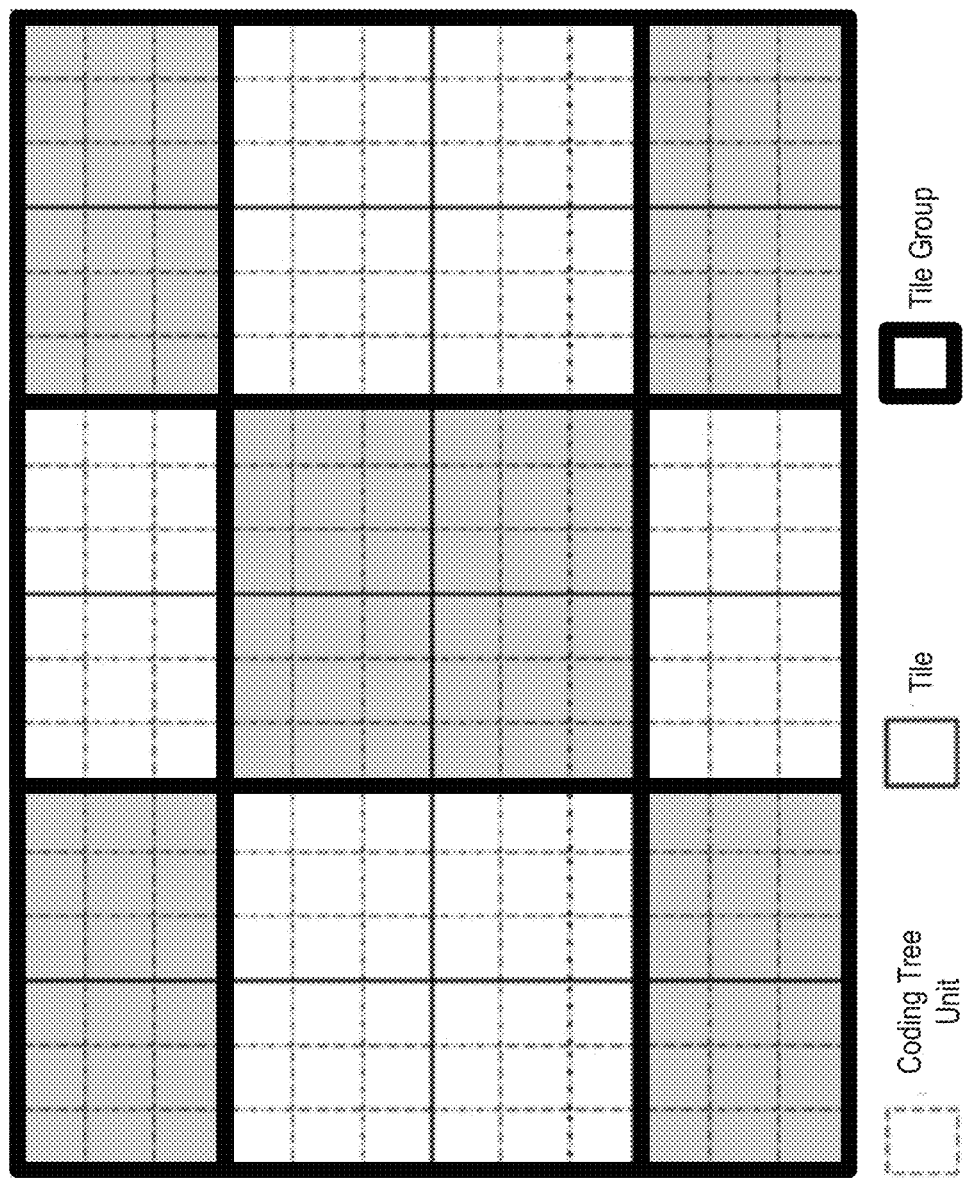
FIG. 6 is a graphical representation illustrating an exemplary partitioning of an image frame in a rectangular tile group mode, according to embodiments of the disclosure.

FIG. 5 is a graphical representation illustrating an exemplary partitioning 500 of an image frame in a raster-scan tile group mode, according to embodiments of the disclosure. FIG. 6 is a graphical representation illustrating an exemplary partitioning 600 of an image frame in a rectangular tile group mode, according to embodiments of the disclosure. In the VVC standard, a tile may be defined as a rectangular region of coding tree units within a particular tile column and a particular tile row in an image frame. A tile group may include a group of tiles from an image frame which are exclusively included in a single network abstraction layer (NAL) unit. Basically, a tile group may be the same as or similar to a slice as defined in the HEVC standard. For example, an image frame can be divided into tile groups and tiles, where a tile may include a sequence of coding tree units that cover a rectangular region of the image frame, and a tile group may include a plurality of tiles of the image frame.

Two tile group modes are supported in the VCC standard, including a raster-scan tile group mode and a rectangular tile group mode. In the raster-scan tile group mode, a tile group may include a sequence of tiles in tile raster scan of an image frame. For example, FIG. 5 shows an example of a raster-scan tile group partitioning of an image frame. The image frame in FIG. 5 includes 12×18 luma coding tree units. The 12×18 luma coding tree units are divided into 12 tiles, and the 12 tiles are divided into 3 raster-scan tile groups.

In the rectangular tile group mode, a tile group may include a plurality of tiles of an image frame that collectively form a rectangular region of the image frame. The tiles within a rectangular tile group are in the order of tile raster scan of the tile group. For example, FIG. 6 shows an example of a rectangular tile group partitioning of an image frame. The image frame in FIG. 6 includes 12×18 luma coding tree units. The 12×18 luma coding tree units are divided into 24 tiles (6 tile columns and 4 tile rows), and the 24 tiles are divided into 9 rectangular tile groups.

Figure 7:
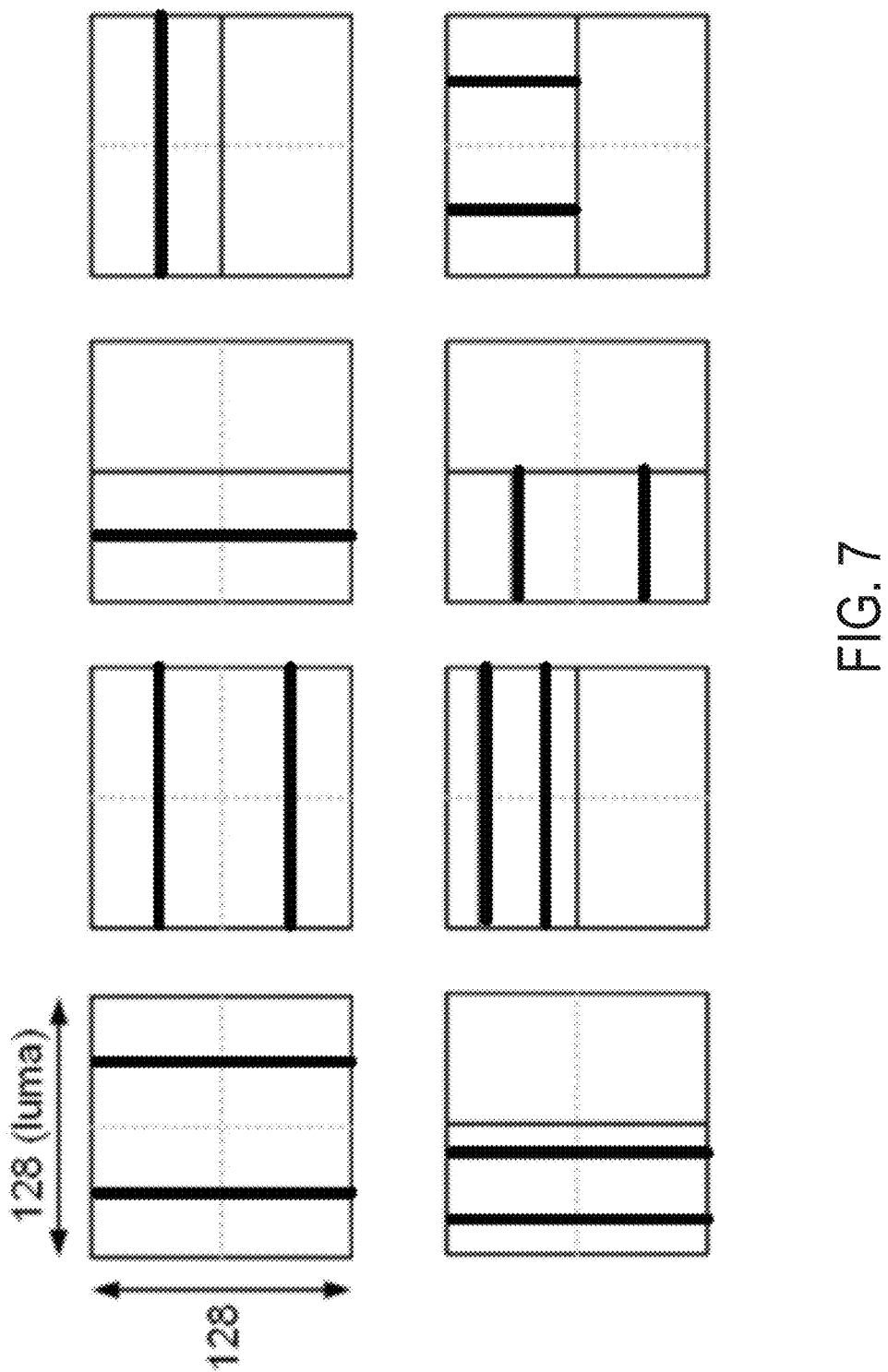
FIG. 7 is a graphical representation illustrating exemplary disallowed ternary tree partitioning and binary tree partitioning in a VVC test model (VTM), according to embodiments of the disclosure.
Figure 9B:
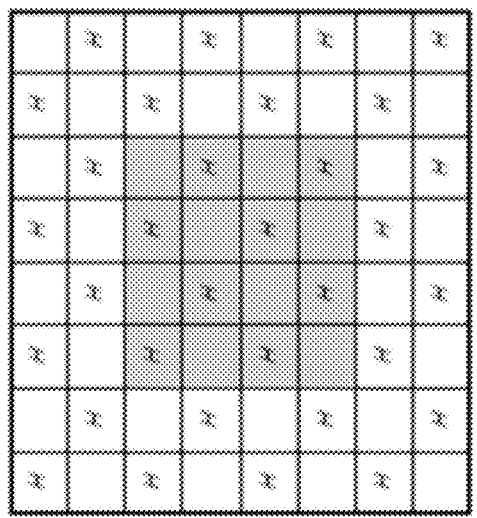
FIGS. 9A-9D are graphical representations illustrating exemplary subsampled positions for gradient calculation of four different directions, according to embodiments of the disclosure.
Figure 9D:
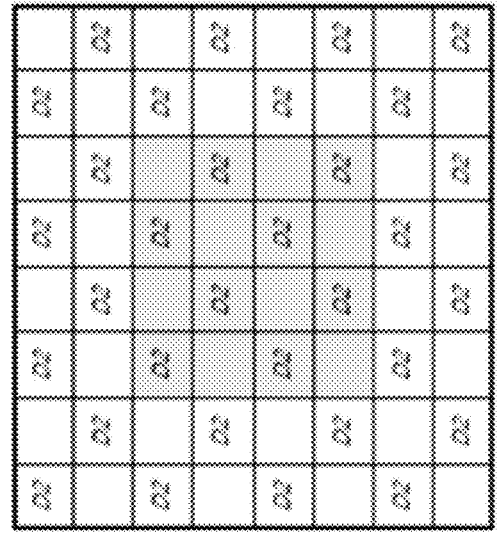
Figure 9A:
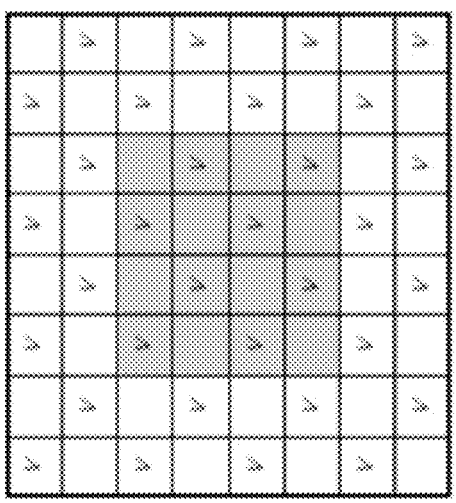
Figure 9C:
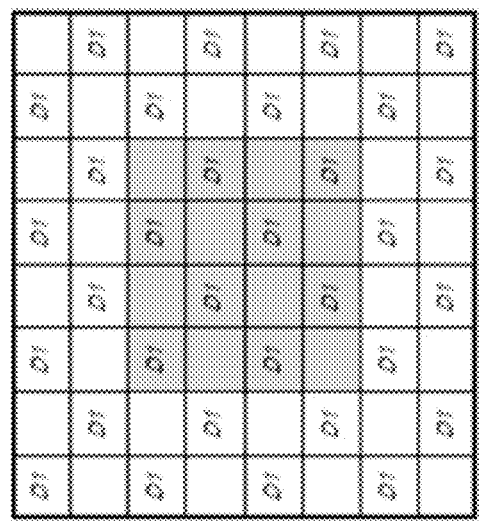

FIG. 7 is a graphical representation illustrating exemplary disallowed ternary tree partitioning and binary tree partitioning in a VVC test model, according to embodiments of the disclosure. Each image block in FIG. 7 may include 128×128 luma samples. The disallowed partitioning is illustrated using bold lines in FIG. 7.

Figures 8A, 8B:
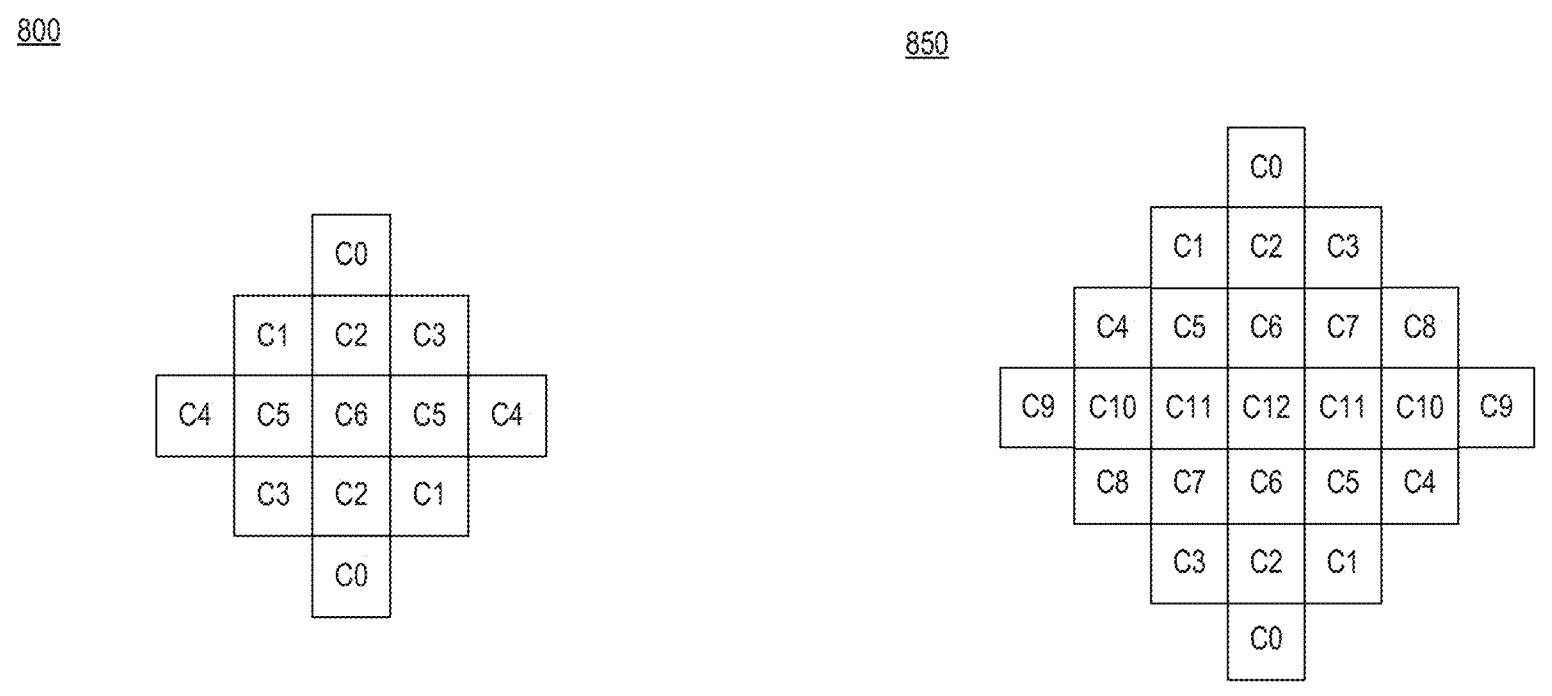

FIG. 8A is a graphical representation illustrating an exemplary filter shape 800 of an adaptive loop filter for a chroma component, according to embodiments of the disclosure. An adaptive loop filter having a 5×5 diamond shape may be applied for the chroma component. FIG. 8B is a graphical representation illustrating an exemplary filter shape 850 of an adaptive loop filter for a luma component, according to embodiments of the disclosure. An adaptive loop filter having a 7×7 diamond shape may be applied for the luma component.

In some embodiments, for the luma component, an adaptive loop filter may be selected from a set of predefined adaptive loop filters (e.g., 25 predefined adaptive loop filters) for each block of the luma component based on the direction and activity of local gradients. Each block of the luma component may be a reconstructed block having, for example, M1×M1 reconstructed luma samples (M1 being a positive integer, e.g., M1=4).

Specifically, a block classification may be performed for each block of the luma component, such that one of the predefined adaptive loop filters may be selected for the block of the luma component based on the block classification. For example, each block of the luma component may be categorized into one of 25 classes, such that one of the 25 predefined adaptive loop filters corresponding to the one of the 25 classes may be selected for the block of the luma component. A classification index C may be used to identify the one of the 25 classes in which the block of the luma component is categorized into. The classification index C may be derived based on a directionality D and a quantized value of an activity Â, as shown in the following expression (7):

$$C = 5D + \hat{A}. \qquad (7)$$

To calculate D and Â, gradients of a horizontal direction, a vertical direction, and two diagonal directions may be calculated using 1-D Laplacian using the following expressions (8)-(11):

$$sum_v = \sum_{k=i-2}^{i+3} \sum_{l=j-2}^{j+3} V_{k,l}, \; V_{k,l} = |2R(k,l) - R(k,l-1) - R(k,l+1)| \quad (8)$$

$$sum_h = \sum_{k=i-2}^{i+3} \sum_{l=j-2}^{j+3} H_{k,l}, \; H_{k,l} = |2R(k,l) - R(k-1,l) - R(k+1,l)| \quad (9)$$

$$sum_{d0} = \sum_{k=i-2}^{i+3} \sum_{l=j-3}^{j+3} D0_{k,l}, \; D0_{k,l} = |2R(k,l) - R(k-1,l-1) - R(k+1,l+1)| \quad (10)$$

$$sum_{d1} = \sum_{k=i-2}^{i+3} \sum_{j=j-2}^{j+3} D1_{k,l}, \; D1_{k,l} = |2R(k,l) - R(k-1,l+1) - R(k+1,l-1)|. \quad (11)$$

In the above expressions (8)-(11), indices i and j refer to the coordinates of an upper left sample within the block of the luma component, and R(i, j) indicates a reconstructed sample at the coordinate point (i, j).

To reduce the complexity of the block classification, the subsampled 1-D Laplacian calculation may be applied. FIGS. 9A-9D are graphical representations illustrating exemplary subsampled positions for gradient calculation of four different directions, according to embodiments of the disclosure. The four directions may include a horizontal direction, a vertical direction, and two diagonal directions. As shown in FIGS. 9A-9D, the same subsampled positions are used for gradient calculation of all of the four directions.

Then, the directionality D in the above expression (7) may be derived by $D_{main}$ and $D_{strength}$ as shown in the following expressions (12):

$$D = ((D_{main} \& 0 \times 1) \ll 1) + D_{strength} \quad (12)$$

The $D_{main}$ and $D_{strength}$ may be derived by $HV_0$, $HV_1$, $Dir_0$, $Dir_1$, $HVD_0$, $HVD_1$, $Dtemp_{HV}$, and $Dtemp_{D01}$ as shown in the following expressions (13)-(20):

$$HV_0 = (sum_v > sum_h)? sum_v : sum_h \quad (13)$$

$$HV_1 = (sum_v > sum_h)? sum_h : sum_v \quad (14)$$

$$Dtemp_{HV} = (sum_v > sum_h)? 1 : 3 \quad (15)$$

$$Dir_0 = (sum_{d0} > sum_{d1})? sum_{d0} : sum_{d1} \quad (16)$$

$$Dir_1 = (sum_{d0} > sum_{d1})? sum_{d1} : sum_{d0} \quad (17)$$

$$Dtemp_{D01} = (sum_{d0} > sum_{d1})? 0 : 2 \quad (18)$$

$$D_{main} = (Dir_1 * HV_0 > Dir_0 * HV_1)? Dtemp_{D01} : Dtemp_{HV} \quad (19)$$

$$D_{strength} = (HVD_1 > 2 * HVD_0)? 1 : (HVD_1 * 2 > 9 * HVD_0)? 2 : 0. \quad (20)$$

The activity value A can be calculated using the following expression (21):

$$A = sum_v + sum_h \quad (21)$$

Then, the activity value A may be further quantized to a range of 0 to 4, inclusively, and the quantized value may be denoted as Â.

In some embodiments, with respect to each chroma component, no block classification method is applied to blocks of the chroma component. Then, an identical set of coefficients can be used in an adaptive loop filter for each block of the chroma component. That is, an adaptive loop filter with the identical set of coefficients can be applied to all the blocks of the chroma component. A block of the chroma component may be a reconstructed block having, for example, M2×M2 reconstructed chroma samples (M2 being a positive integer, M2=4).

In some embodiments, geometric transformations may be performed on filter coefficients and filter clipping values associated with an adaptive loop filter. Specifically, before filtering each block of the luma component (e.g., a block of 4×4 reconstructed luma samples), geometric transformations such as rotation or diagonal and vertical flipping may be applied to the filter coefficients f(j) and the corresponding filter clipping values c(j) depending on gradient values calculated for the block. This is equivalent to applying these transformations to the samples in the filter support region. Thus, different blocks to which the adaptive loop filter is applied can be made to be more similar by aligning their directionality.

With respect to an adaptive loop filter being applied to the lama component, filter coefficients $f_L(j)$ and filter clipping values $c_L(j)$, j=0, . . . , 11, can be derived by filtIdx$_L$[x][y] and AlfCoeff$_L$[i], which are coefficient sets signaled from video encoder 105. For example, the filter coefficients $f_L(j)$ and the filter clipping values $c_L(j)$ can be obtained using the following expressions (22)-(28):

$$f_L(j) = \text{AlfCoeff}_L[i][\text{filt}Idx[x][y]][j] \quad (22)$$

$$c_L(j) = \text{AlfClip}_L[i][\text{filtIdx}[x][y]][j] \quad (23)$$

$$\text{transposeTable}[\;] = \{0, 1, 0, 2, 2, 3, 1, 3\} \quad (24)$$

$$\text{transposeIdx}[x][y] = \text{transposeTable}[\text{dir1}[x][y]*2 + (\text{dir2}[x][y] \gg 1)] \quad (25)$$

$$\text{varTab}[\;] = \{0, 1, 2, 2, 2, 2, 2, 3, 3, 3, 3, 3, 3, 3, 3, 4\} \quad (26)$$

$$\text{avgVar}[x][y] = varTab[Clip3(0, 15, (Â[x \gg 2][y \gg 2]*ac[x \gg 2][y \gg 2]) \gg (3 + BitDepth))]) \quad (27)$$

$$filtIdx_L[x][y] = \begin{cases} avgVar[x][y], & \text{if } D_{strength} \text{ is not equal to } 0 \\ += D * 5, & \& x \geq 0 \end{cases} \quad (28)$$

With respect to an adaptive loop filter being applied to the chroma component, filter coefficients $f_C(j)$ and filter clipping values $c_C(j)$, j=0 . . . 5, may be derived by altIdx and $AlfCoeff_C$[i], where altIdx denotes an index of a coefficient set, and AlfCoeff$_C$[i] denotes coefficient sets that are signaled from video encoder 105. For example, the filter coefficients $f_C(j)$ and the filter clipping values $c_C(j)$, j=0 . . . 5, can be obtained using the following expressions (29)-(30):

$$f_C(j) = \text{AlfCoeff}_C[\text{slice\_alf\_aps\_id\_chroma}][\text{altIdx}][j] \quad (29)$$

$$c_C(j) = \text{AlfClip}_C[\text{slice\_alf\_aps\_id\_chroma}][\text{altIdx}][j]. \quad (30)$$

In the VTM7, filter parameters of the adaptive loop filter may be signaled in an adaptation parameter set (APS). In one APS, up to 25 sets of luma filter coefficients and clipping value indices and up to eight sets of chroma filter coefficients and clipping value indices may be signaled. To reduce bit overhead, filter coefficients of different classifications for the luma component can be merged. In a slice header, one or more indices of one or more APSs used for a current slice may be signaled.

The clipping value indices, which may be decoded from the APS, can be used to determine clipping values using a luma table of clipping values and a chroma table of clipping values. These clipping values are dependent on an internal bit depth. The luma table of clipping values and the chroma table of clipping values may be obtained using the following expression (31):

$$AlfClip=\{round(2^{B-2.35*n}) \text{ for } n \in [0, \ldots, N-1]\}. \quad (31)$$

In the above expression (31), B is equal to the internal bit depth, and N is equal to 4 (which is the number of allowed clipping values in VTM7.0).

For the lurna component, up to 7 APS indices can be signaled to specify the luma filter sets used for the current slice in the slice header. The filtering process can be further controlled at the coding tree block level. A flag may be signaled to indicate whether the adaptive loop filter is applied to a luma coding tree block. For a luma coding tree block, a filter set can be selected from 16 fixed filter sets or from the filter sets indicated by the APSs. A filter set index may be signaled for the luma coding tree block to indicate which filter set is applied to the luma coding tree block. The 16 fixed filter sets are predefined and hard-coded in both video encoder 105 and video decoder 155.

For the chroma component, an APS index may be signaled in the slice header to indicate a chroma filter set being used for the current slice. At the coding tree block level, a filter index may be signaled for each chromacoding tree block if there is more than one chroma filter set in the APS.

The filter coefficients may be quantized with a norm that is equal to 128. To restrict the multiplication complexity, a bit stream conformance may be applied so that a coefficient value of a non-central position can be in a range of $-2^7$ to $2^7-1$. A central position coefficient may not be signaled in the bit stream and may be equal to 128. Besides the filter coefficient sets signaled in the APS, 16 predefined filter sets may also be defined in the VVC standard. Video encoder 105 may select the adaptive loop filter from the 16 predefined filter sets in the VCC standard or from the ones signaled through the APS.

With respect to video decoder 155, when the adaptive loop filter is enabled for a coding tree block, each sample R(i, j) within the coding tree block is filtered, resulting in a corresponding sample value R'(i, j) as shown in the following expression (32):

$$R'(i,j)=Clip(0,(1\ll BitDepth)-1,R(i,j)+\Sigma_{k\neq 0}\Sigma_{l\neq 0}f(k,l)\times K(R(i+k,j+l)-R(i,j),c(k,l))+64)\gg 7)). \quad (32)$$

In the above expression (32), f(k, l) denotes decoded filter coefficients, K(x, y) denotes a clipping function, and c(k, l) denotes decoded clipping parameters. Variables k and l may vary between $$-\frac{L}{2} \text{ and } \frac{L}{2},$$

where L denotes a filter length. The clipping function may be K(x, y)=min(y, max(-y, x)), which corresponds to the function Clip3 (-y, y, x). After the filtering process, the sample value R'(i, j) may be clipped into [0,(1≪BitDepth)−1] to prevent overflow for each component. A bit depth (e.g., BitDepth) may be varied for different color component.

Figure 10:
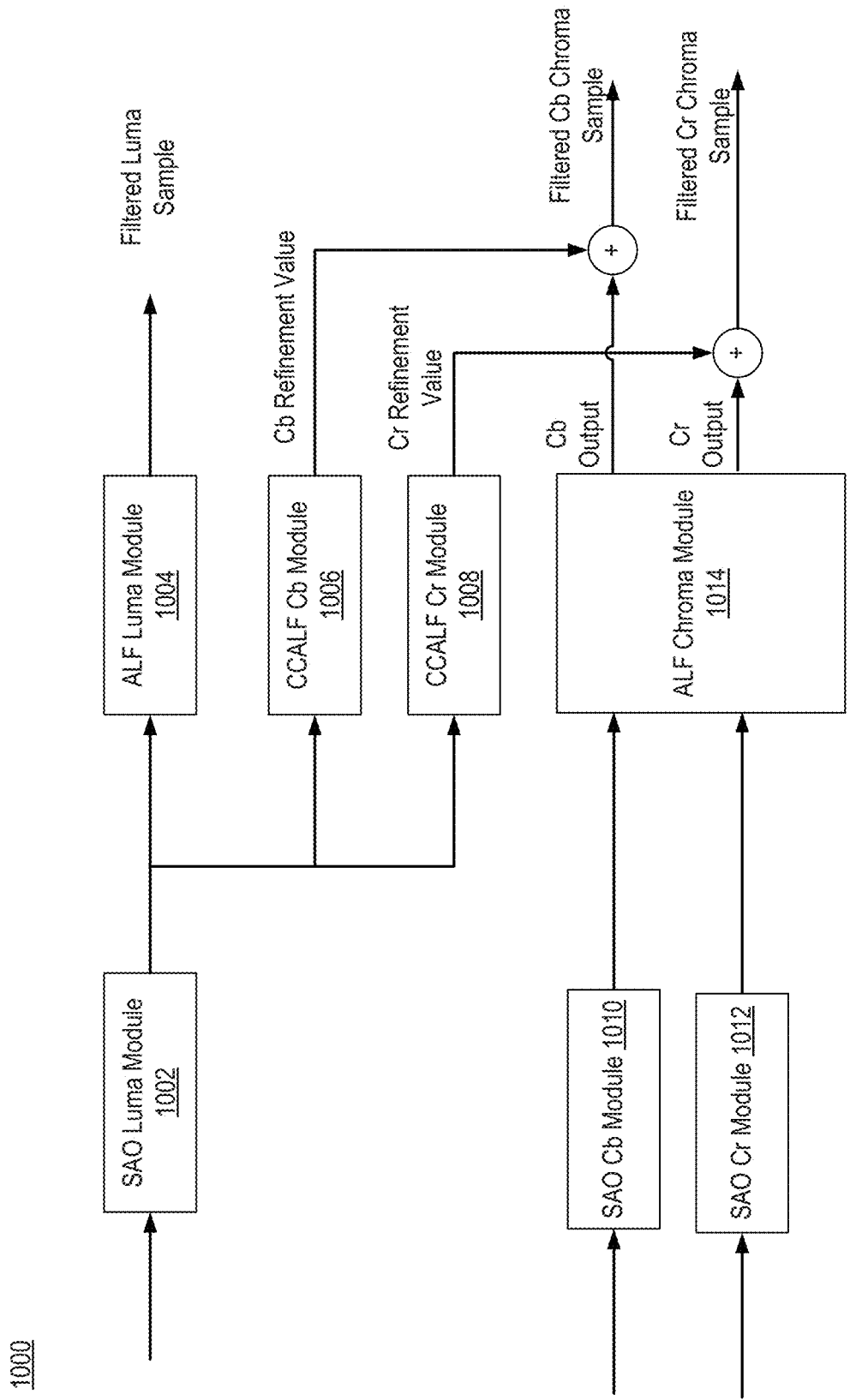
FIG. 10 is a schematic diagram of an exemplary placement of a cross-component adaptive loop filter (CCALF), according to embodiments of the disclosure.
Figure 11:
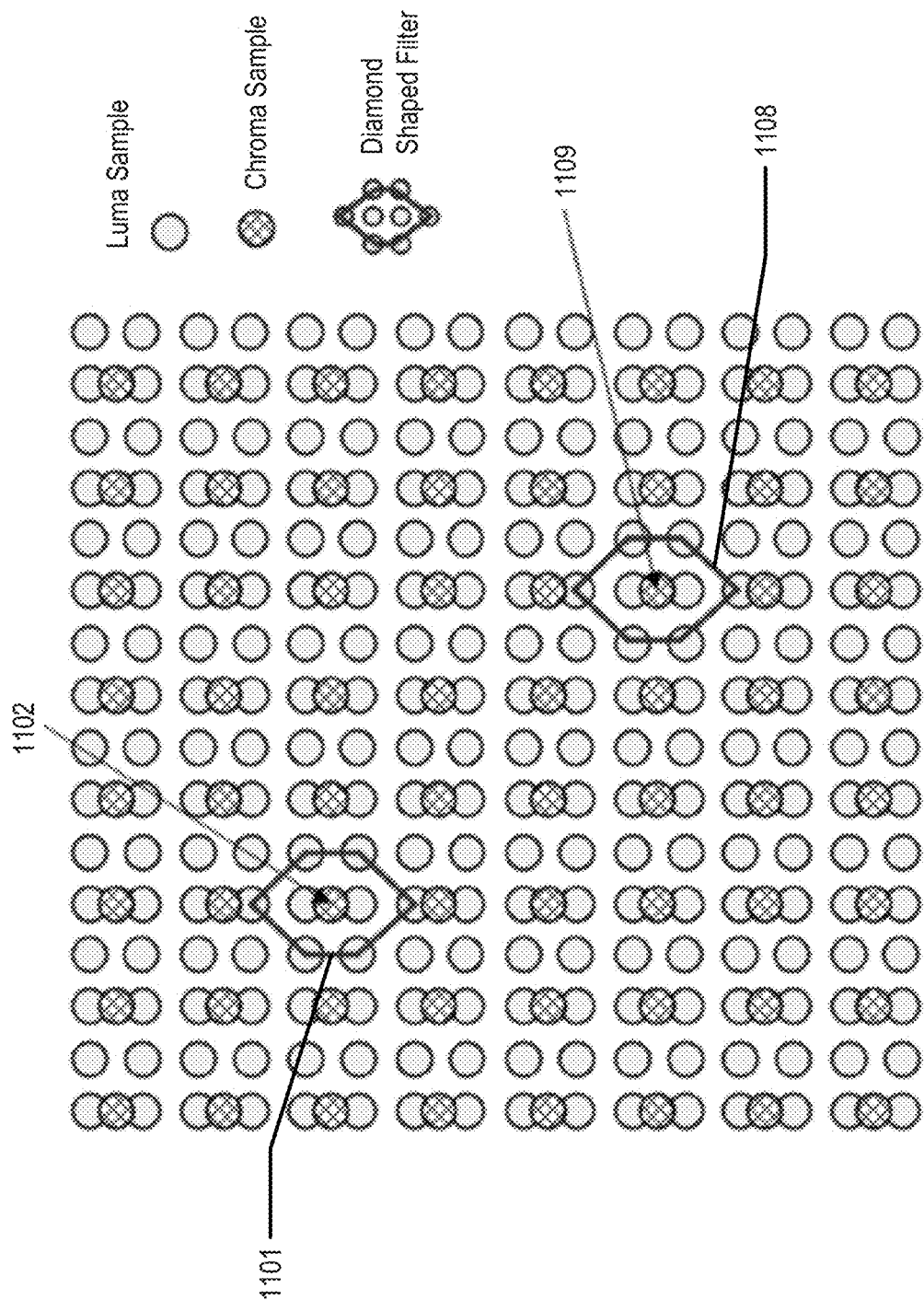
FIG. 11 is a graphical representation illustrating exemplary diamond shaped filters used in a CCALF, according to embodiments of the disclosure.

FIG. 10 is a schematic diagram of an exemplary placement 1000 of a CCALF, according to embodiments of the disclosure. The CCALF may use luma samples to refine reconstructed chroma samples. The CCALF may include a CCALF Cb module 1006 and a CCALF Cr module 1008. In some embodiments, the CCALF (including CCALF Ch module 1006 and CCALF Cr module 1008) operates by applying a linear diamond shaped filter to luma samples of the luma component to obtain a chroma refinement value for each chroma sample (e.g., a Cb refinement value for each Cb chroma sample and a Cr refinement value for each Cr chroma sample). Exemplary diamond shaped filters are shown in FIG. 11. The filter coefficients of the CCALF are transmitted in the APS, scaled by a factor of 26 and rounded for fixed point representation. The application of the CCALF may be controlled at a block level and signaled as a context-coded flag (i.e., a first bin of a CCALF filter index) for each block of samples. The CCALF is applicable to blocks with variable sizes.

As shown in FIG. 10, a luma output from a SAO luma module 1002 may be inputted into an ALF luma module 1004 and processed by ALF luma module 1004 to generate filtered luma samples. The luma output of SAO luma module 1002 may also be used as an input for CCALF Ch module 1006 and CCALF Cr module 1008. CCALF Cb module 1006 and CCALF Cr module 1008 may generate Ch refinement values for Cb chroma samples and Cr refinement values for Cr chroma samples based on the luma output of SAO luma module 1002, respectively.

An ALF chroma module 1014 may receive a Cb input from a SAO Cb module 1010 and a Cr input from a SAO Cr module 1012. ALF chroma module 1014 may generate a Cb output based on the Cb input and a Cr output based on the Cr input, respectively. Next, the Cb output from ALF chroma module 1014 may be added to the Cb refinement values from CCALF Cb module 1006 to generate filtered Cb chroma samples. The Cr output from ALF chroma module 1014 may be added to the Cr refinement values from CCALF Cr module 1008 to generate filtered Cr chroma samples.

In some embodiments, each of SAO luma module 1002, SAO Cb module 1010, and SAO Cr module 1012 may be implemented by a respective SAO filter. Each of ALF luma module 1004 and ALF chroma module 1014 may be implemented by a respective adaptive loop filter. For example, ALF luma module 1004 may include a luma adaptive loop filter. ALF chroma module 1014 may include a Cb-component chroma adaptive loop filter for generating the Cb output and a Cr-component chroma adaptive loop filter for generating the Cr output.

FIG. 11 is a graphical representation illustrating exemplary diamond shaped filters 1101 and 1108 used in a CCALF, according to embodiments of the disclosure. A plurality of luma samples (e.g., 8 luma samples) within diamond shaped filter 1101 may be used to refine a chroma sample 1102. Similarly, a plurality of luma samples (e.g., 8 luma samples) within diamond shaped filter 1108 may be used to refine a chroma sample 1109.

In the CCALF, several high-level signaling can be transmitted to video decoder 155 to indicate an on/off switch for each component (e.g., the luma component, the Cb and Cr chroma components). In the VTM, ALF data syntax may be signaled in a raw byte sequence payload (RSP) trailing bits syntax as shown in the following Table 1.

TABLE 1

| | Descriptor |
|---|---|
| alf_data( ) { | |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   ... | |
|   if ( alf_cross_component_cb_filter_signal_flag ) { | |
|     alf_cross_component_cb_filters_signalled_minus1 | ue(v) |
|     for( k = 0; k < (alf_cross_component_cb_filters_signalled_minus1+1); k++ ) { | |
|       for ( j = 0;j < 8;j++ ) | |
|         alf_cross_component_cb_coeff_plus32[ k ][ j ] | u(6) |
|     } | |
|   } | |
|   if ( alf_cross_component_cr_filter_signal_flag ) { | |
|     alf_cross_component_cr_filters_signalled_minus1 | ue(v) |
|     for( k = 0; k < (alf_cross_component_cr_filters_signalled_minus1+1); k++ ) { | |
|       for ( j = 0;j < 8;j++ ) | |
|         alf_cross_component_cr_coeff_plus32[ k ][ j ] | u(6) |
|     } | |
|   } | |
| } | |

As shown in the following Table 2, the CCALF also signals enabling syntax (e.g., slice_cross_component_alf_cb_enabled_flag, slice_cross_component_alf_cr_enabled_flag) and a parameter set index (e.g., slice cross_component_alf_cb_aps_id, slice_cross_component_alf_cr_aps_id) for each chroma component in a slice level. The enabling syntax indicates whether the CCALF is applied for a current slice. The parameter set index indicates which slice the current slice refers to.

TABLE 2

| | |
|---|---|
| if( sps_alf_enabled_flag ) { | |
|   slice_alf_enabled_flag | u(1) |
|   if( slice_alf_enabled_flag ) { | |
|     slice_num_alf_aps_ids_luma | u(3) |
|     for( i = 0; i < slice_num_alf_aps_ids_luma; i++ ) | |
|       slice_alf_aps_id_luma[ i ] | u(3) |
|     if( ChromaArrayType != 0 ) | |
|       slice_alf_chroma_idc | u(2) |
|     if( slice_alf_chroma_idc ) | |
|       slice_alf_aps_id_chroma | u(3) |
|   } | |
|   if( ChromaArrayType != 0 ) | |

TABLE 2-continued

| | |
|---|---|
|     slice_cross_component_alf_cb_enabled_flag | u(1) |
|   if( slice_cross_component_alf_cb_enabled_flag ) { | |
|     slice_cross_component_alf_cb_aps_id | u(3) |
|   } | |
|   if( ChromaArrayType != 0 ) | |
|     slice_cross_component_alf_cr_enabled_flag | u(1) |
|   if( slice_cross_component_alf_cr_enabled_flag ) { | |
|     slice_cross_component_alf_cr_aps_id | u(3) |
|   } | |
| } | |

For the signaling in the CTB level, a CCALF filter index for each chroma component, e.g., including alf_ctb_cross_component_cb_idc for the Cb chroma component and alf_ctb_cross_component_cr_idc for the Cr chroma component, may be signaled to indicate which CCALF filters are applied for the Cb and Cr chroma components of a current coding tree unit, respectively. The CCALF filter index may be set to 0 to indicate that the CCALF is not applied for a current CTB. If a non-zero CCALF filter index is signaled, it indicates that a CCALF corresponding to the signaled CCALF filter index is applied for the current CTB. The following Table 3 indicates the signaling of the CCALF filter index.

TABLE 3

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   if( slice_sao_luma_flag | | slice_sao_chroma_flag ) | |
|     sao( xCtb >> CtbLog2SizeY, yCtb >> CtbLog2SizeY ) | |
|   if( slice_alf_enabled_flag ){ | |
|     alf_ctb_flag[ 0 ][ xCtb >> CtbLog2SizeY ][ yCtb >> CtbLog2SizeY ] | ae(v) |
|     if( alf_ctb_flag[ 0 ][ xCtb >> CtbLog2SizeY ][ yCtb >> CtbLog2SizeY ] ) { | |
|       if( slice_num_alf_aps_ids_luma > 0 ) | |
|         alf_ctb_use_first_aps_flag | ae(v) |
|       if( !alf_ctb_use_first_aps_flag ) { | |
|         if( slice_num_alf_aps_ids_luma > 1 ) | |
|           alf_use_aps_flag | ae(v) |
|         if( alf_use_aps_flag ) { | |
|           if( slice_num_alf_aps_ids_luma > 2 ) | |
|             alf_luma_prev_filter_idx_minus1 | ae(v) |
|         } else | |

TABLE 3-continued

| | Descriptor |
|---|---|
|     alf_luma_fixed_filter_idx | ae(v) |
|    } | |
|  } | |
| if( slice_alf_chroma_idc = = 1 \|\| slice_alf_chroma_idc = = 3 ) { | |
|   alf_ctb_flag[ 1 ][ xCtb >> CtbLog2SizeY ][ yCtb >> CtbLog2SizeY ] | ae(v) |
|   if( alf_ctb_flag[ 1 ][ xCtb >> CtbLog2SizeY ][ yCtb >> CtbLog2SizeY ] | |
|     && aps_alf_chroma_num_alt_filters_minus1 > 0 ) | |
|     alf_ctb_filter_alt_idx[ 0 ][ xCtb >> CtbLog2SizeY ][ yCtb >> CtbLog2SizeY ] | ae(v) |
| } | |
| if( slice_alf_chroma_idc = = 2 \|\| slice_alf_chroma_idc = = 3 ) { | |
|   alf_ctb_flag[ 2 ][ xCtb >> CtbLog2SizeY ][ yCtb >> CtbLog2SizeY ] | ae(v) |
|   if( alf_ctb_flag[ 2 ][ xCtb >> CtbLog2SizeY ][ yCtb >> CtbLog2SizeY ] | |
|     && aps_alf_chroma_num_alt_filters_minus1 > 0 ) | |
|     alf_ctb_filter_alt_idx[ 1 ][ xCtb >> CtbLog2SizeY ][ yCtb >> CtbLog2SizeY ] | ae(v) |
|  } | |
| } | |
| if ( slice_cross_component_alf_cb_enabled_flag ) | |
|   alf_ctb_cross_component_cb_idc[ xCtb >> CtbLog2SizeY ][ yCtb >> CtbLog2SizeY ] | ae(v) |
| if ( slice_cross_component_alf_cr_enabled_flag ) | |
|   alf_ctb_cross_component_cr_idc[ xCtb >> CtbLog2SizeY ][ yCtb >> CtbLog2SizeY ] | ae(v) |
| } | |

The inputs for the CCALF (e.g., CCALF Cb module 1006 and CCALF Cr module 1008 of FIG. 10) may include (1) reconstructed luma samples (recPicture$_L$) before they are processed by ALF luma module 1004, (2) ALF filtered reconstructed chroma samples (alfPicture$_c$), and (3) CCALF filter coefficients (CCALFCoeff[j], with j=0 . . . 7). The output of the CCALF is CCAlfPicture$_c$, which can be derived based on the following expressions (33)-(38):

$$curr = alfPicture_C[xCtbC+x, yCtbC+y] \quad (33)$$

$$f[j] = CCALFCoeff[j] \quad (34)$$

$$\begin{aligned}sum = &f[0]*recPicture_L[h_x, v_{y+yM1}] + f[1]*recPicture_L\\&[h_{x+xM1}, v_y] + f[2]*recPicture_L[h_x, v_y] +\\&f[3]*recPicture_L[h_{x+xP1}, v_y] + f[4]*rec\\&Picture_L[h_{x+xM1}, v_{y+yP1}] + f[5]*recPicture_L\\&[h_x, v_{y+yP1}] + f[6]*recPicture_L[h_{x+xP1}, v_{y+yP1}] +\\&f[7]*recPicture_L[h_x, v_{y+yP2}]\end{aligned} \quad (35)$$

$$sum = Clip3(-(1 \ll (BitDepth_C-1)), (1 \ll (BitDepth_C-1))-1, sum) \quad (36)$$

$$sum = curr + (sum+64) \gg (7+(BitDepth_Y - BitDepth_C)) \quad (37)$$

$$CCAlfPicture_C[xCtbC+x][yCtbC+y] = Clip3(0,(1 \ll BitDepth_C)-1, sum). \quad (38)$$

In the above expressions (33)-(38), xCtbC and yCtbC denote x and y coordinates of the top left position of a current chroma CTB, respectively. Values of yM1, xM1, xP1, and yP1 may be specified as shown in the following Table 4 and Table 5. The clipTopPos, clipBottom, clipLeftPos, and clipRightPos are the above, bottom, left, and right positions of the ALF boundary, respectively. Table 4 provides a specification of yM1, yP1, and yP2 according to vertical luma sample positions yL, clipTopPos, and clipBottomPos. Table 5 provides a specification of xM1 and xP1 according to horizontal luma sample positions xL, clipLeftPos and clipRightPos.

TABLE 4

| Condition | yM1 | yP1 | yP2 |
|---|---|---|---|
| yL = = clipTopPos + 1 | −1 | 1 | 1 |
| yL = = clipTopPos | 0 | 0 | 1 |
| yL = = clipBottomPos − 1 | 0 | 0 | 1 |

TABLE 4-continued

| Condition | yM1 | yP1 | yP2 |
|---|---|---|---|
| yL = = clipBottomPos − 2 | −1 | 1 | 1 |
| Otherwise | −1 | 1 | 2 |

TABLE 5

| Condition | xM1 | xP1 |
|---|---|---|
| xL = = clipLeftPos | 0 | 0 |
| xL = = clipRightPos − 1 | 0 | 0 |
| xL = = clipRightPos − 2 | −1 | 1 |
| Otherwise | −1 | 1 |

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A computer-implemented method for applying an adaptive loop filter in video coding, comprising:
   determining, by a video processor, a first rate-distortion cost of applying the adaptive loop filter on a reconstructed block, wherein the reconstructed block comprises a reconstructed version of an image block of an image frame from a video;

determining, by the video processor, a second rate-distortion cost of not applying the adaptive loop filter on the reconstructed block; and determining, by the video processor, whether to apply the adaptive loop filter for processing the reconstructed block based on the first rate-distortion cost and the second rate-distortion cost, wherein determining whether to apply the adaptive loop filter for processing the reconstructed block comprises:

determining whether the first rate-distortion cost is smaller than the second rate-distortion cost and whether the first rate-distortion cost is smaller than a first threshold, and responsive to the first rate-distortion cost being smaller than the second rate-distortion cost and the first rate-distortion cost being smaller than the first threshold, applying the adaptive loop filter for processing the reconstructed block; or determining whether the first rate-distortion cost is smaller than the second rate-distortion cost and whether a cost difference between the second rate-distortion cost and the first rate-distortion cost is greater than a second threshold, and responsive to the first rate-distortion cost being smaller than the second rate-distortion cost and the cost difference being greater than the second threshold, applying the adaptive loop filter for processing the reconstructed block; or determining whether the first rate-distortion cost is smaller than the second rate-distortion cost and whether a distortion difference associated with the reconstructed block is greater than a third threshold, and responsive to the first rate-distortion cost being smaller than the second rate-distortion cost and the distortion difference being greater than the third threshold, applying the adaptive loop filter for processing the reconstructed block.

2. The computer-implemented method of claim 1, wherein determining whether the distortion difference associated with the reconstructed block is greater than the third threshold further comprises:

determining a first distortion of applying the adaptive loop filter on the reconstructed block;

determining a second distortion of not applying the adaptive loop filter on the reconstructed block; and determining the distortion difference as a difference between the second distortion and the first distortion.

3. The computer-implemented method of claim 1, wherein determining the first rate-distortion cost further comprises:

determining a first distortion of applying the adaptive loop filter on the reconstructed block;

determining a rate of applying the adaptive loop filter on the reconstructed block; and determining the first rate-distortion cost based on the first distortion and the rate.

4. The computer-implemented method of claim 1, wherein determining the second rate-distortion cost further comprises:

determining a second distortion of not applying the adaptive loop filter on the reconstructed block;

determining a rate of not applying the adaptive loop filter on the reconstructed block; and determining the second rate-distortion cost based on the second distortion and the rate.

5. The computer-implemented method of claim 1, wherein the image frame is processed using an intra-coding mode, and the method further comprises:

determining one or more coefficients of the adaptive loop filter from a set of predefined adaptive loop filters.

6. The computer-implemented method of claim 1, wherein the image frame is processed using an inter-coding mode, and the method further comprises:

determining one or more coefficients of the adaptive loop filter from a set of predefined adaptive loop filters or from one or more historical coefficients associated with a previously-coded image frame.

7. The computer-implemented method of claim 1, wherein the reconstructed block comprises a coding tree block.

8. The computer-implemented method of claim 1, wherein the adaptive loop filter comprises at least one of a luma adaptive loop filter, a Cb-component chroma adaptive loop filter, a Cr-component chroma adaptive loop filter, or a cross-component adaptive loop filter.

9. A system for applying an adaptive loop filter in video coding, comprising:

a memory configured to store at least an image frame of a video, the image frame comprising at least an image block; and a video processor configured to:

determine a first rate-distortion cost of applying the adaptive loop filter on a reconstructed block, wherein the reconstructed block comprises a reconstructed version of the image block;

determine a second rate-distortion cost of not applying the adaptive loop filter on the reconstructed block; and determine whether to apply the adaptive loop filter for processing the reconstructed block based on the first rate-distortion cost and the second rate-distortion cost, wherein to determine whether to apply the adaptive loop filter for processing the reconstructed block, the video processor is further configured to:

determine whether the first rate-distortion cost is smaller than the second rate-distortion cost and whether the first rate-distortion cost is smaller than a first threshold, and responsive to the first rate-distortion cost being smaller than the second rate-distortion cost and the first rate-distortion cost being smaller than the first threshold, apply the adaptive loop filter for processing the reconstructed block; or determine whether the first rate-distortion cost is smaller than the second rate-distortion cost, and whether a cost difference between the second rate-distortion cost and the first rate-distortion cost is greater than a second threshold, and responsive to the first rate-distortion cost being smaller than the second rate-distortion cost and the cost difference being greater than the second threshold, apply the adaptive loop filter for processing the reconstructed block; or determine whether the first rate-distortion cost is smaller than the second rate-distortion cost and whether a distortion difference associated with the reconstructed block is greater than a third threshold, and responsive to the first rate-distortion cost being smaller than the second rate-distortion cost and the distortion difference being greater than the third threshold, apply the adaptive loop filter for processing the reconstructed block.

10. A non-transitory computer-readable storage medium configured to store instructions which, when executed by a video processor, cause the video processor to perform a process for applying an adaptive loop filter in video coding, the process comprising:
   determining a first rate-distortion cost of applying the adaptive loop filter on a reconstructed block, wherein the reconstructed block comprises a reconstructed version of an image block of an image frame from a video;
   determining a second rate-distortion cost of not applying the adaptive loop filter on the reconstructed block; and
   determining whether to apply the adaptive loop filter for processing the reconstructed block based on the first rate-distortion cost and the second rate-distortion cost, wherein determining whether to apply the adaptive loop filter for processing the reconstructed block comprises:
      determining whether the first rate-distortion cost is smaller than the second rate-distortion cost and whether the first rate-distortion cost is smaller than a first threshold, and responsive to the first rate-distortion cost being smaller than the second rate-distortion cost and the first rate-distortion cost being smaller than the first threshold, applying the adaptive loop filter for processing the reconstructed block; or
      determining whether the first rate-distortion cost is smaller than the second rate-distortion cost, and whether a cost difference between the second rate-distortion cost and the first rate-distortion cost is greater than a second threshold, and responsive to the first rate-distortion cost being smaller than the second rate-distortion cost and the cost difference being greater than the second threshold, applying the adaptive loop filter for processing the reconstructed block; or
      determining whether the first rate-distortion cost is smaller than the second rate-distortion cost and whether a distortion difference associated with the reconstructed block is greater than a third threshold, and responsive to the first rate-distortion cost being smaller than the second rate-distortion cost and the distortion difference being greater than the third threshold, applying the adaptive loop filter for processing the reconstructed block.

11. The system of claim 9, wherein to determine whether the distortion difference associated with the reconstructed block is greater than the third threshold, the video processor is further configured to:
   determine a first distortion of applying the adaptive loop filter on the reconstructed block;
   determine a second distortion of not applying the adaptive loop filter on the reconstructed block; and
   determine the distortion difference as a difference between the second distortion and the first distortion.

12. The system of claim 9, wherein to determine the first rate-distortion cost, the video processor is further configured to:
   determine a first distortion of applying the adaptive loop filter on the reconstructed block;
   determine a rate of applying the adaptive loop filter on the reconstructed block; and
   determine the first rate-distortion cost based on the first distortion and the rate.

13. The system of claim 9, wherein to determine the second rate-distortion cost, the video processor is further configured to:
   determine a second distortion of not applying the adaptive loop filter on the reconstructed block;
   determine a rate of not applying the adaptive loop filter on the reconstructed block; and
   determine the second rate-distortion cost based on the second distortion and the rate.

14. The system of claim 9, wherein the image frame is processed using an intra-coding mode, and the video processor is further configured to:
   determine one or more coefficients of the adaptive loop filter from a set of predefined adaptive loop filters.

15. The system of claim 9, wherein the image frame is processed using an inter-coding mode, and the video processor is further configured to:
   determine one or more coefficients of the adaptive loop filter from a set of predefined adaptive loop filters or from one or more historical coefficients associated with a previously-coded image frame.

16. The system of claim 9, wherein the reconstructed block comprises a coding tree block.

17. The system of claim 9, the adaptive loop filter comprises at least one of a luma adaptive loop filter, a Cb-component chroma adaptive loop filter, a Cr-component chroma adaptive loop filter, or a cross-component adaptive loop filter.

18. The non-transitory computer-readable storage medium of claim 10, wherein determining whether the distortion difference associated with the reconstructed block is greater than the third threshold further comprises:
   determining a first distortion of applying the adaptive loop filter on the reconstructed block;
   determining a second distortion of not applying the adaptive loop filter on the reconstructed block; and
   determining the distortion difference as a difference between the second distortion and the first distortion.

19. The non-transitory computer-readable storage medium of claim 10, wherein determining the first rate-distortion cost further comprises:
   determining a first distortion of applying the adaptive loop filter on the reconstructed block;
   determining a rate of applying the adaptive loop filter on the reconstructed block; and
   determining the first rate-distortion cost based on the first distortion and the rate.

20. The non-transitory computer-readable storage medium of claim 10, wherein determining the second rate-distortion cost further comprises:
   determining a second distortion of not applying the adaptive loop filter on the reconstructed block;
   determining a rate of not applying the adaptive loop filter on the reconstructed block; and
   determining the second rate-distortion cost based on the second distortion and the rate.

* * * * *